United States Patent [19]

Nimmo

[11] Patent Number: 5,152,229
[45] Date of Patent: Oct. 6, 1992

[54] ZINC SULFIDE OR SELENOSULFIDE MATERIAL

[75] Inventor: John A. Nimmo, Henley-on-Thames, United Kingdom

[73] Assignee: Johnson Matthey Public Limited Company, London, United Kingdom

[21] Appl. No.: 600,909

[22] Filed: Oct. 22, 1990

[30] Foreign Application Priority Data

Oct. 20, 1989 [GB] United Kingdom ............... 8923657

[51] Int. Cl.$^5$ .................. C09C 1/04; C04B 14/36
[52] U.S. Cl. ...................... 106/420; 106/400; 106/401
[58] Field of Search .......................... 106/420

[56] References Cited

U.S. PATENT DOCUMENTS

| | | | |
|---|---|---|---|
| 3,372,997 | 3/1968 | Bither, Jr. | 423/508 |
| 4,086,123 | 4/1978 | Hummel et al. | 106/420 |
| 4,094,704 | 6/1978 | Milnes | 437/2 |
| 4,216,023 | 8/1980 | Kinstle | 106/420 |
| 4,707,297 | 11/1987 | Paske, Jr. et al. | 106/8 |
| 4,755,856 | 7/1988 | Nishizawa | 437/80 |
| 4,904,618 | 2/1990 | Neumark | 148/DIG. 1 |
| 4,939,043 | 6/1990 | Biricik et al. | 148/33.4 |

FOREIGN PATENT DOCUMENTS

| | | |
|---|---|---|
| 2448558 | 9/1980 | France . |
| 51-75692 | 6/1976 | Japan . |
| 63-184343 | 7/1988 | Japan . |
| 795464 | 5/1958 | United Kingdom . |

OTHER PUBLICATIONS

Nassau's "The Physics and Chemistry of Color: The Fifteen Causes of Color", Chapter 8, Wiley, New York, 1983.

"Dependence of energy gap on x and T in $Zn_{1-x}Mn_xSe$: The role of exchange interaction", Bylsma, et al., Physical Review B, vol. 33, No. 12, 15 Jun. 1986, The American Physical Society, pp. 8207–8215.

"Preparation and Crystal Growth of Materials in the Pseudo-Binary $CuInSe_2$-SnSe and $CuGaSe_2$-SnSe Systems", Lambrecht, Jr., Mat. Res. Bull. vol. 8, pp. 1383–1387, 1973, Pergamon Press, Inc.

"Optical properties of the $(CuInSe_2)_{1-x}$-$(2ZnSe)_x$ systems", Gan, et al., Physical Review B, vol. 12, No. 12, 13 Dec. 1975, pp. 5797–5802.

"Luminescence Centers in Doped ZnSe and the Activation Energy of their Formation", Kukk, et al., translated from Izvestiya Akademii Nauk SSSR, Neorganicheskie Materialy, vol. 16, No. 11, pp. 1916–1920, Nov. 1990, Plenum Pub. Corp.

"Cell Dimensions and Electric Properties of the Solid Solutions . . . ", Donohue, et al., Electrochemical Science and Technology, vol. 121, No. 3, pp. 327–328.

Chemical Abstracts, vol. 110, No. 2, Jan. 1989, Columbus, Ohio, USA A. Kamata: "Zinc selenide sulfide crystal growth by metal–organic chemical vapor deposition" p. 565.

Soviet Physics-Crystallography, vol. 14, No. 4, Jan.-Feb. 1970, pp. 531 and 532, "Crystal Structure of Solid Solutions in the ZnSe–CdSe System".

Russian Journal of Inorganic Chemistry, 1960 5 (8), pp. 871 and 872, "Effect of Structure and Composition on the Width of the Forbidden Gap in the ZnSe–CdSe System".

Phys Chem Solids, 1962 23 pp. 1479 and 1480, "Solubility of ZnSe and ZnTe in CdS".

Chemical Abstracts, vol. 5, 11907d, abstract of Fiz Tverd Tela 4, 1535–41 (1962), "Activation energy dependence on molar composition in some $A^{II}B^{VI}$-$A^{II}B^{VI}$ systems in thin layers".

Chemical Abstracts, 4731d, abstract of Izv Akad Nauk USSR, Ser Fiz 28(6), 1065–8 (1964), "Structure and Electrical Properties of the ZnSe–HgSe System".

Primary Examiner—Karl Group
Assistant Examiner—Scott L. Hertzog
Attorney, Agent, or Firm—Stevens, Davis, Miller & Mosher

[57] ABSTRACT

A pigment comprises a material comprising crystalline zinc selenide or selenosulphide below 40% of whose zinc atoms and optionally some of whose selenium and sulphur atoms are substituted to lower the band gap energy but retain the essential crystal lattice of the zinc selenide or silenosulphide, the resulting lattice containing a greater percentage of zinc atoms than of sulphur atoms. The material wherein at least 0.1% of the zinc atoms are substituted is a new composition of matter.

20 Claims, No Drawings

ZINC SULFIDE OR SELENOSULFIDE MATERIAL

This invention relates to a pigment which comprises a material, to a material useful especially as a pigment, to substances coloured by containing the pigment, and to the preparation of these items.

Pigments are used to colour a wide range of substances, for example paints, polymeric resins, plastic articles, glazes, ceramic ware and glass. According to the German standard DIN 55943 a pigment is a colourant in powder form which is virtually insoluble in the application medium. Generally, inorganic pigments, are more resistant to high temperature than are organic pigments, and can be used in substances subjected to a high temperature, such as glazes, ceramic ware or glass. Inorganic pigments can also be used in substances subjected to a medium temperature, such as resins to be extruded or moulded, and in substances subjected to relatively low temperatures, such as paints or varnishes.

Cadmium pigments are used very extensively. Cadmium sulphide itself produces a yellow pigment, and cadmium sulphide in combination with varying amounts of zinc sulphide or cadmium selenide produces a range of yellow to maroon pigments. Another important yellow pigment is lead chromate. With growing concern for the environment, the use of heavy metals such as cadmium and lead has become less popular, and for years people have searched for alternative pigments.

U.S. Pat. No. 4,086,123, applied for in 1977, discloses a pigment comprising a zinc sulphide host containing in solid solution at least a sufficient amount of a metal sulphide-containing dopant to alter the colour of the zinc sulphide, said dopant being selected from the group consisting of lithium sulphide, calcium sulphide, gallium sulphide, lithium indium sulphide, lithium indium sulphide and copper indium sulphide, lithium indium sulphide and silver indium sulphide, lithium sulphide and chromium sulphide, indium sulphide and copper oxide, indium sulphide and lithium oxide, lithium sulphide and manganese sulphide and copper sulphide, and mixtures thereof.

U.S. Pat. No. 4,216,023, applied for in 1979, discloses a pigment comprising a zinc sulphide host containing in solid solution at least a sufficient amount of a dopant to alter the colour of the zinc sulphide, the dopant comprising copper indium sulphide in which selenium replaces at least some of the sulphur.

Japanese Specification 51075692A discloses that a yellow pigment comprising zinc selenide or zinc selenosulphide containing mainly zinc selenide is prepared by reacting an aqueous solution containing water soluble zinc salt and/or almost insoluble zinc salt with an alkali containing selenium, or sulphur and selenium, to form a precipitate which is then calcined.

Materials Research Bulletin, volume 8, number 12, 1973, pages 1383-1388 concerns solid solution formation in $CuM^{III}Se_2$(chalcopyrite)-ZnSe(sphalerite) systems (where $M^{III}$=In, Ga). The article reports that these systems form extensive terminal regions of solid solutions and that large crystals of some of the compositions can be prepared from the melt by directional freezing in horizontal boats or by the Bridgeman technique.

Phys. Rev. B: Condens. Matter, 1986, 33(12, Pt. 1), 8207-15, abstracted as Chemical Abstracts, volume 105, number 8, August 1986, page 582, reference number 69404p concerns photoluminescence and reflectivity measurements carried out on $Zn_{1-x}Mn_xSe$ solid solutions, where $0 \leq x \leq 0.55$.

Japanese Specification 63184343 concerns a growth process for a semiconductor crystalline compound in which lithium is added in the growth process of $ZnS_xSe_{(1-x)}$ where $0 \leq x \leq 1$ in the metal organic chemical vapour deposition method using an organometallic compound.

J. Electrochem. Soc.: Electrochemical Science and Technology, volume 121 number 3, pages 327 and 328 concerns the cell dimensions and electrical properties of solid solutions in the systems $(1-x)ZnS/xCuAlS_2$ and $(1-x)ZnSe/xCuAlSe_2$ for $x=0$ to 0.33.

Inorganic Materials (USA), 1980, volume 16 (II), page 1302-5 concerns the nature of the defects responsible for luminescence in ZnSe activated with copper, copper and indium, copper and chlorine, or indium.

We have pursued the quest for replacements for cadmium and other heavy metal pigments by approaching the matter from the point of view of band gap. Eventually, we have discovered a remarkably good material not based on cadmium, lead etc.

Accordingly, the invention provides a pigment which comprises a material comprising crystalline zinc selenide or selenosulphide below 40% of whose zinc atoms and optionally some of whose selenium and sulphur atoms are substituted to lower the band gap energy but retain the essential crystal lattice of the zinc selenide or selenosulphide, the resulting lattice containing a greater percentage of zinc atoms than of sulphur atoms.

The invention provides also a method for preparing the pigment wherein the number average maximum particle size of the material as measured by scanning electron microscopy is 0.01-5 micron, which method comprises grinding the material to that size.

The invention also provides the present material as a new composition of matter where it is novel. In particular, the invention provides as a new composition of matter the material wherein at least 0.1% of the zinc atoms are substituted.

The invention provides also a process for preparing the novel material, which process comprises forming a solid solution of the substituent moieties in zinc selenide or selenosulphide.

The invention also provides a substance coloured by containing the present pigment dispersed therein.

The invention provides also a method of preparing this substance, which method comprises dispersing the pigment in the substance.

The present material possesses remarkable visual and photoelectric properties, especially as a pigment though it is active also as a solar cell material and as a photoconductor material. The pigment is coloured in the sense that when it is seen by a normal unaided human eye receiving light reflected from it, the material is perceived as exhibiting a dominant colour which is describable in terms of at least one of four so-called "basic colours". These basic colours (namely red, yellow, green and blue) are used to describe colour as a physiological sensation rather than a physical property analysable by spectroscopy. The use of the four basic colours together with two other parameters (which are "lightness" and "chroma") to describe colour as perceived by the eye is explained in Chapter 1 of the book "Colouring of Plastics" edited by T G Webber and published by Wiley-Interscience of New York in 1979. In particular, the book outlines the CIElab colour coordinates system for describing colour and also explains how a colour can be intermediate in the sense that it is describable in terms of two or more basic colours. For example, orange as perceived by the eye is describable as a combination of red and yellow even though to a spectroscopist a pure orange might contain only one wavelength of light. The book explains how colours can be expressed as an angle of from 0° to 360° and that this angle is called the "hue" of the colour. For example, reds have hue angles of about 0°, yellows of about 90°, greens of about 180° and blues of about 270°. Intermediate angles represent shades describable in terms of more than one basic colour (for example 60° represents an orange which is describable in terms of red and yellow).

As mentioned above, the ZnS-CdS-CdSe system produces a range of yellow to maroon pigments. The present material produces a similar range of colours, depending on the substituents and their concentration. In terms of the CIElab colour co-ordinates system, the present pigment generally has a hue angle ranging from 104° C. down to 0° C. It usually has a hue angle ranging from below the 90° (a yellow hue) of zinc selenide to about 0° (a red hue), e.g. from 85° to 5°, especially 60° to 15°. Hue angles referred to in this specification are expressed on this system.

The present pigment is of good chroma, giving a rich colour. Its chroma in terms of the CIElab colour co-ordinates system is usually at least 15, for instance from 15 to 60. The pigment is highly opaque. It is of low toxicity. It is useful in a wide range of applications. Compared to a corresponding system based on crystalline zinc sulphide, rather than crystalline zinc selenide or selenosulphide, the present invention enables colours to be achieved which cannot be achieved by the zinc sulphide system and particular substituents and enables colours to be achieved with less substitution.

Cadmium sulphide and cadmium selenide are semiconductors. The present invention employs as essential crystal lattice that of zinc selenide or zinc selenosulphide, which are very little known in visual and photoelectric, in particular colour, chemistry. They too are semiconductors. Incorporating into their lattice the present substituents to lower its band gap energy such that the lattice contains a greater percentage of zinc atoms than of sulphur atoms results in a remarkably good material, especially a remarkably good pigment.

The present essential crystal lattice is preferably that of zinc selenide. Some of its selenium atoms can be substituted by sulphur atoms, but such substitution is preferably avoided or kept low since otherwise more of the zinc atoms need to be substituted to achieve a given colour, if enough can be substituted at all while retaining the essential crystal lattice. Looked at in another way, the substituent moieties have to form a solid solution in the zinc selenide or selenosulphide. Thus, the substituted lattice preferably contains at least one third as many selenium atoms as sulphur atoms, especially at least as many selenium atoms as sulphur atoms, and particularly more than three times as many selenium atoms as sulphur atoms. There may be no sulphur atoms present.

Band gap energy is the minimum room temperature energy gap between the valence band and the conduction band of a material, and is usually expressed in electron volts. Zinc selenide has a band gap energy of 2.6 eV. Zinc sulphide has a band gap energy of 3.5 eV; the present zinc selenosulphide has a band gap energy in between.

The present substituents must lower the band gap energy, for instance to 1.9 eV. Moieties are accordingly substituted into the crystalline zinc selenide or selenosulphide from materials which have a lower band gap energy than zinc selenide or zinc selenosulphide as the case may be. Such materials can be regarded as added to zinc selenide or selenosulphide host lattice and can be considered as dopants. In terms of the structure of the present material, the addition of a dopant means that atoms in the crystalline zinc selenide or selenosulphide are substituted by atoms from the dopant where these are different. In some cases atoms in the dopant are the same as those in the crystalline zinc selenide or selenosulphide. This occurs when such atoms are selenium atoms (in the case of crystalline zinc selenide or selenosulphide) or sulphur atoms (in the case of crystalline zinc selenosulphide). References to substitution, addition and dopants herein, however, do not mean that the present products are necessarily made in any particular way, merely how they can be considered theoretically for clarity and how they can be prepared. Band gap energies for materials are known or can be measured. The present dopant also forms a solid solution in zinc selenide or selenosulphide. For this purpose it usually has the same crystal structure as zinc selenide or selenosulphide. Whether a particular candidate for use as a dopant forms the solid solution can readily be tested. The particular dopant and hence substitution chosen should not interfere of course with the desired properties of the product material, in particular the pigment.

Whether the essential crystal lattice is that of zinc selenide or that of zinc selenosulphide, the dopant preferably has a band gap energy below that of zinc selenide. Especially preferred is the dopant having a band gap energy less that 1.8 eV, for instance between 0.5 and 1.8 eV.

The band gap energy of the present doped material is generally 1.4 to 3.5 eV, preferably 1.8 to 2.7 eV.

In a preferred embodiment, the dopant is a ternary chalcopyrite which is a II-IV-V$_2$ or I-III-VI$_2$ semiconductor. A II-IV-V$_2$ semiconductor contains one atom from group II, one atom from group IV and two atoms from group V, of the periodic table (the periodic table being as published for instance in Advanced Inorganic Chemistry, 4th edition, 1980, by F. A. Cotton and G. Wilkinson, published by John Wiley and Sons). A I-III-VI$_2$ semiconductor is analogous. Ternary chalcopyrites have a structure which is the simplest, non-cubic, ternary analogue of the binary zinc blende structure.

In another preferred embodiment, the dopant is a metal (which can be mixed metal) sulphide, selenide or sulphoselenide, e.g. lithium sulphide, gallium sulphide or indium sulphide. Preferably the dopant contains copper and indium moieties.

Especially preferred is a dopant of formula $$XY_{(0.1-10)}Z_{(0.1-100)}O_{(0-100)} \qquad (1)$$

in which

X represents at least one of Cu, Ag and Li;

Y represents at least one of In, Fe and Ga; and

Z represents at least one of S and Se.

In terms of the structure of the present material, the incorporation of this dopant mean that in the crystalline zinc selenide or selenosulphide:

(1) the zinc atoms which are substituted are substituted by atoms selected from (a) Cu, Ag and Li atoms and (b) In, Fe and Ga atoms in the proportion of 0.1-10 atoms of (b) per atom of (a); and (2) The selenium and sulphur atoms which are substituted are substituted by O atoms in the proportion of up to 100 atoms of O per atom of (a).

X is at least one of Cu, Ag and Li. More than one of these may be present so that together one atomic proportion of X is present in the formula. Preferably, however, only one of these is present. Preferably X is or includes Cu.

Y is at least one of In, Fe and Ga. More than one of these may be present so that together 0.1-10 atomic proportions of Y are present in the formula. Preferably, however, only one of these is present. In a particular embodiment, Y is at least one of In and Fe. Especially preferred is Y being In.

Z is at least one of S and Se. Both of these may be present so that together 0.1-100 atomic proportions of Z are present in the formula.

The dopant of this formula can contain O, but this is not preferred. The O can be introduced incidentally from the air in producing the present material.

Preferably, this dopant contains 0.1-1.5 atoms of Y per atom of X. It contains usually 1-50, preferably 1-20, especially 1-10, atoms of Z per atom of X. Thus, preferably the dopant is of formula $$XY_{(0.1-1.5)}Z_{(1-20)}$$

In a more especially preferred embodiment, the dopant is of formula $$XY_{(0.1-5)}Z_{(0.1-10)}O_{(0-10)} \quad (2)$$

in which

X represents at least one of Cu, Ag and Li;
Y represents at least one of In, Fe and Ga; and
Z represents at least one of S and Se.

What has been discussed above in relation to formula (1) applies to formula (2) *mutatis mutandis*. Preferably, the dopant of formula (2) is of formula $$XY_{(0.1-1.5)}Z_{(1-5)}$$

It can be seen that the dopant may or may not be stoichiometric. In a preferred embodiment it is stoichiometric, for instance of formula $XYS_{2-x}Se_x$ where x represents a number from 0 to 2. In this embodiment, x represents for example a number from 0.5 to 1.5, for instance from 1.1 to 1.5, and in a specific instance sulphur and selenium are present in substantially equal atomic proportions, i.e. x is approximately 1, for instance between 0.9 and 1.1. A particular dopant is of formula $$CuInS_{(2-x)}Se_x$$

in which x represents a number from 0.5 to 1.5, particularly CuInSSe.

Other specific dopants of formula (1) are $CuInS_2$, $CuInSe_2$, $AgFeS_2$, $AgFeSe_2$, $LiInS_2$, $LiInSe_2$, $AgInS_2$, $AgInSe_2$, $LiFeS_2$ and $LiFeSe_2$.

The dopant of formula $CuInSe_2$ or CuInSSe gives, in solid solution in zinc selenide, a range of bright orange, red and maroon coloured pigment materials, depending on its concentration. The range closely resembles that of the ZnS-CdS-CdSe range of pigment materials.

The most preferred dopant is $CuInSe_2$.

The more dopant is employed in the solid solution, i.e. the more substitution there is in the crystalline zinc selenide or selenosulphide, the more the band gap energy is lowered and the more the colour of the pigment material is shifted from the yellow of the crystalline zinc selenide or selenosulphide towards maroon or black, i.e. towards longer wavelengths of the spectrum.

When using the dopant of formula (1) the principal effect of substituting increasing amounts of selenium for sulphur in Z in the formula is to shift the hue angle of the pigment material from higher to lower values, e.g. from about 85° to about 5° for a red hue, i.e. towards longer wavelengths.

We are not aware of any known inorganic alternative to red cadmium pigments in plastics. Accordingly, in a preferred embodiment the present pigment material is red, say of a hue angle from 45° to 5°.

The present essential crystal lattice is that of zinc selenide or zinc selenosulphide (and this lattice can be determined by X-ray diffraction). In the crystalline zinc selenide or zinc selenosulphide some of the zinc atoms and optionally some of the selenium atoms and optionally (in the case of zinc selenosulphide) some of the sulphur atoms are substituted, thus modifying the basic lattice slightly while retaining its essential structure. The substitution is such that the resultant material is of lower band gap energy. It has been found that a small amount of substitution can have a major impact on the visual and photoelectric properties and in particular on the colour. The essential lattice can be regarded as having cationic sites and anionic sites, with the cationic sites being occupied by the zinc and its substituents, and the anionic sites being occupied by the selenium and any sulphur atoms and the substituents of either, with the possibility of moieties also being present interstitially (for instance in amount up to 20, for example up to 10, atomic percent of the crystalline material). Moieties may be present as polyatomic species. It will be appreciated that though the present material, as discussed above, can be considered in terms of a host lattice and a dopant, one might not be able to tell in the material whether a particular anionic moiety (for instance a sulphur atom) is associated with a zinc moiety of the host or a cationic moiety of the dopant; nevertheless, the basic host lattice can be regarded as formed by zinc selenide or zinc selenosulphide and the remaining atoms can be regarded as forming the dopant. Though the concept of dopant is useful in understanding the structure of the present material and how it can be prepared, it is preferred to define the material in terms of theoretical substitution in crystalline zinc selenide or selenosulphide. There may be of course additional features of the crystal structure, for instance vacant sites (for example in amount up to 5% of the sites) or moieties, for example from impurities, which do not destroy its essential nature.

The lattice of the present material contains a greater percentage of zinc atoms than of sulphur atoms. The lattice preferably contains no sulphur at all, but when it does, the material cannot be regarded as zinc sulphide doped with a sulphide or selenide of a different metal.

The minimum amount of substitution in the crystalline zinc selenide or zinc selenosulphide is that which alters its visual or photoelectric properties, and amounts which alter the colour are of particular importance. Generally at least 0.1%, usually at least 0.4%, of the zinc atoms are substituted. Increasing amounts of substitution can be used, subject to retaining the essential crystal lattice of the zinc selenide or zinc selenosulphide. Adding increasing amount of dopants might eventually form a solid solution of zinc selenide or zinc selenosulphide in the dopant rather than vice versa.

Less than 40% of the zinc atoms in the crystalline zinc selenide or zinc selenosulphide are substituted. To achieve the desired properties, in particular of colour, the lattice in preferred embodiments contains much less substitution than this. Generally less than 20%, preferably less than 10%, for instance less than 6%, of the zinc atoms are substituted.

In a preferred embodiment, the present material comprises crystalline zinc selenide or selenosulphide below 20% of whose zinc atoms and optionally some of whose selenium and sulphur atoms are substituted to lower the band gap energy but retain the essential crystal lattice of the zinc selenide or selenosulphide, the resulting lattice containing at least one third as many selenium atoms as sulphur atoms.

In an especially preferred embodiment, the present material comprises crystalline zinc selenide or selenosulphide below one third of whose zinc atoms and optionally some of whose selenium and sulphur atoms are substituted to lower the band gap energy but retain the essential crystal lattice of the zinc selenide or selenosulphide, the resulting lattice containing at least as many selenium atoms as sulphur atoms.

Some of the selenium and sulphur atoms in the present crystalline zinc selenide or zinc selenosulphide can be substituted, for instance by oxygen atoms. Usually less than 50%, preferably less than 30%, especially less than 10%, of the selenium and sulphur atoms, and in particular none of them, are substituted.

The present material can contain more phases than just that of the present substituted zinc selenide or selenosulphide. In particular, it can also contain at least one other phase stemming from more dopant material being employed in the preparation than forms a solid solution in the host lattice. Such multiple phase materials are usually less desirable than the single phase system. The brilliance of the colour of a single phase system tends to be reduced, and weaker, dirtier colours result, on increasing the amount of the material used as dopant so as to form multiple phases. However, pigments having such multiple phases are still useful in applications which require a less brilliant hue.

The invention provides a process for preparing the novel material, which process comprises forming a solid solution of the substituent moieties defined above in zinc selenide or zinc selenosulphide, such that the lattice contains a greater percentage of zinc atoms than of sulphur atoms. In terms of dopant, this means forming a solid solution of the dopant in zinc selenide or selenosulphide host lattice, such that the lattice contains a greater percentage of zinc atoms than of sulphur atoms. This can be done by heating the host (e.g. zinc selenide), or precursor thereof which forms the host during the process, with the dopant, or precursor thereof which forms the dopant during the process, to a temperature high enough so that the solid solution will be formed on cooling, and then cooling to form the solid solution. The heating is usually to a temperature of 600°–1200° C., preferably 600°–1000° C. In a particular embodiment, the temperature is 700°–1200° C., preferably 700°–1000° C.

The heating is preferably carried out by increasing the temperature, e.g. at 1°–10° C. per minute, from room temperature or an intermediate temperature, e.g. 200° C., up to a temperature, e.g. 900° C. or higher, at which the ingredients equilibrate so that the solid solution will be formed on cooling. The ingredients should be held at the appropriate temperature until no further change occurs, usually for 0.5–15 hours. The ingredients are then cooled, e.g. at 1°–10° C. per minute, to room temperature.

The heating can be performed in a furnace.

The heating is preferably carried out under vacuum or under an appropriate (i.e. non-deleterious) atmosphere, e.g. an atmosphere of argon or an atmosphere of hydrogen and nitrogen and optionally helium, to avoid the formation of any metal oxide which might be deleterious. In a preferred embodiment, the reactants are sealed in an evacuated capsule, for example of quartz, which is then heated. Alternatively, a container (for instance of porcelain) can be filled with the reactants, closed against the ingress of air (for instance by means of a lid) and then heated.

Preferably host (e.g. zinc selenide) itself, rather than precursor which forms it during the process, is employed. Alternatively, however, precursors can be employed. For instance, one can employ zinc and selenium as precursors, or in the case of a zinc selenosulphide host one can employ zinc selenide and zinc sulphide as precursors.

The dopant itself, rather than precursor which forms it during the process, can be employed. Alternatively, however, precursors can be employed. For instance, the elements of the dopant (e.g. copper, indium, and sulphur and/or selenium in the case of the dopant of formula (1) above) can be employed. For example, the elements of the dopant can be employed with the elements (e.g. zinc and selenium) of the host lattice.

When the dopant comprises a mixed metal sulphide, mixed metal selenide or mixed metal sulphoselenide, the individual metal sulphides (e.g. copper sulphide and indium sulphide in the case of the dopant of formula (1) above), the individual metal selenides (e.g. copper selenide and indium selenide in the case of the dopant of formula (1) above), or individual metal sulphide and metal selenide (e.g. copper sulphide and indium selenide, or indium sulphide and copper selenide, or copper sulphide, indium sulphide and indium selenide, in the case of the dopant of formula (1) above) can be employed as dopant precursors. When this technique is employed, the individual precursors are preferably co-precipitated, since this facilitates intimate admixture. One or preferably all of the individual precursors can be co-precipitated with host (e.g. zinc selenide) for the same reason.

In one embodiment, the present process comprises intimately mixing solid components and then heating the mixture to form (on cooling) the solid solution. In this embodiment, both dopant and host are preferably pre-formed.

In another embodiment, the present process comprises forming an intimate mixture of solid components by co-precipitation and then heating the co-precipitate to form (on cooling) the solid solution.

In a preferred technique in which the dopant is of formula (1) above, selenium is dissolved in a solution of sodium sulphide, and the resulting solution is admixed with a solution containing X, Y and zinc moieties to produce a co-precipitate which is then heated to form (on cooling) the desired material.

When the dopant includes a copper moiety, this can be introduced as a component in the cupric form but preferably the component is in the cuprous form. When the dopant includes an iron moiety, this can be introduced as a component in the ferrous form but preferably the component is in the ferric form.

When the dopant or host is pre-formed, this is preferably done by heating together precursors which form the dopant or host on heating, for instance the precursors discussed above.

In the preparation of the material by heating to form the solid solution, a mineraliser may be incorporated with the reactants in order to promote crystallisation and more rapid attainment of thermodynamic equilibrium. The mineraliser can then be removed, for example by dissolving it out in water. The mineraliser is usually an alkali metal halide or alkaline earth metal halide or a mixture thereof.

The present material is preferably a pigment material. The number average maximum particle size of the pigment material as measured by scanning electron microscopy is usually 0.01-5, preferably 0.1-5, especially 0.1-2, micron. The particle size of the pigment material can be reduced by grinding. The particles may be aggregated, but this is not preferred.

The present material can be formulated and used in conventional ways.

When the material is a pigment material, it can contain the usual additives, for instance in amount up to 90%, preferably up to 50%, by weight. The additive can be an extender, for instance barium sulphate. Additives, for example barium sulphate, may be employed which do not seriously affect the colour, or the additives may even provide desired off-shades. A particular additive is lithopone (a combination of zinc sulphide and barium sulphate). Other additives can be surfactants used in small amounts to improve the dispersibility of the pigment. Additives can be present as particles admixed with particles comprising the present substituted zinc selenide or selenosulphide. Alternatively, the additive can be present within the same particle as the present substituted zinc selenide or selenosulphide.

The present pigment material can be admixed with other pigment materials (for example titanium dioxide), e.g. to obtain pastel colours or secondary pigment colours such as brown, grey or green. Preferably, it is not admixed with cadmium or lead pigment materials.

The present pigment can be used to colour a wide range of substances, for instance ceramic ware, glass, enamels, glazes, paints, varnishes, lacquers, inks, polymeric resins and plastic articles. Preferably, the pigment is used to colour a polymeric resin to be moulded or extruded to form a plastic article; the temperature stability of the pigment contributes to its being remarkably good for this purpose.

The substance coloured by the pigment may be for instance a polymer such as a polyolefin, for example polyethylene, polypropylene, polystyrene, polyvinyl chloride, ABS (acrylonitrile-butadiene-styrene copolymer) or polymethyl methacrylate, a polyamide or a polycarbonate.

The substance may contain for instance 0.01-20%, preferably 0.1-20%, by weight of the pigment. Master batches for use in making finished materials, for instance plastic articles, may contain for instance 5-85%, for example 5-50%, by weight of the pigment.

The invention is illustrated by the following Examples.

The following method was used for the measurement of the CIElab colour coordinates of the samples.

The colour coordinates were measured using an ICS-Texicon QMM-2000 instrument with a small rectangular aperture of dimensions 10 mm×5 mm. The instrument was set in reflectance mode with D65 illuminant and a 10° observer angle. The specular component was included, as was the UV component and measurements were made every 20 nm. The CIElab equations were used to calculate the values of lightness (L), chroma (C) and hue angle (H). Before making any measurements, the instrument was calibrated using clean black and white ceramic standard calibration tiles.

(i) Powder Samples

A brass holder was used to contain the powder for colour measurement. This holder consisted of a disc of brass 40 mm in diameter and 10 mm thick, with a circular well of diameter 15 mm and depth 1 mm milled into the centre of one of the flat faces. The pigment powder was packed into the well, taking care to completely fill the well. For these measurements, the powder must be firmly packed into the well and the top surface must be level with the surface of the brass disc. The brass surface should be cleaned of any residual powder and the holder carefully tilted to the vertical to ensure that the powder does not fall out. The packed powder was then presented to the measuring head of the instrument, ensuring that the packed powder surface was aligned with the aperture. After making the measurement, the brass sample holder and powder were removed from the instrument and values of the lightness, chroma and hue angle were plotted, together with the graph of reflectance against wavelength.

(ii) Polymer Samples (Plaques)

The clean plastic plaque was presented to the instrument by placing it between the aperture plate and the spring-loaded sample retaining plate, such that one large flat face of the plaque completely covered the aperture. The measurement was made and values of lightness, chroma and hue angle were recorded, together with a graph of reflectance plotted against wavelength.

(iii) PVC Draw-downs

The clean PVC draw-down was presented to the instrument by placing it between the aperture plate and a clean white tile, which was held in place by the spring-loaded sample retaining plate. The aperture was completely covered by the PVC. The measurement was made and values of lightness, chroma and hue angle were recorded, together with a graph of relectance plotted against wavelength.

All Lightness, Chroma and Hue angle measurements are subject to an error of ±2 units.

In all the Examples, band gap energies were estimated from the midpoint of a graph of reflectance plotted against wavelength. The midpoint wavelengths can also be expressed in nanometers.

For the pigments prepared via a solution route in Examples 72-106 and 163-164, standard solutions of copper and indium nitrates in water were used at the following concentrations:

$Cu^{2+}$—0.006215 g/ml $In^{3+}$—0.00510 g/ml

For the pigments prepared via a solution route in Examples 165-179, the following standard solutions of copper and indium nitrates in water were used:

$Cu^{2+}$—0.0063 g/ml $In^{3+}$—0.0038 g/ml

The invention is illustrated by the following Examples:

EXAMPLE 1

The dopant, copper-indium-sulphoselenide CuInSSe, was prepared by intimately mixing 0.286 g of cuprous sulphide, 0.196 g of indium sulphide and 0.560 g of indium selenide using an agate mortar and pestle, and calcining the mixture in an evacuated quartz ampoule at a temperature of 800° C. for 10 hours, using a heating and cooling rate of 5° C. per minute. This yielded about 1.0 g of a homogeneous, black powder. 0.291 g of this powder was then intimately mixed with 7.074 g of zinc selenide using an agate mortar and pestle. About 1.5 g of this mixture was placed in a quartz ampoule which was then evacuated. The mixture was calcined in a furnace at a temperature of about 900° C. for 10 hours, using a heating and cooling rate of 5° C. per minute. After cooling, the ampoule was opened. The reaction produced a bright red pigment.

The pigment was zinc selenide containing in solid solution 2 mole percent of the dopant. The CIElab colour co-ordinates of the pigment were: Lightness 23.12, chroma 24.91 and hue angle 24.92. Its band gap energy, estimated from the mid point of its graph of reflectance plotted against wavelength, was below 1.9 eV.

Elemental chemical analysis of the dopant revealed it to have the composition:

|    | Weight Percent | Atomic Proportions |
|----|----------------|---------------------|
| Cu | 20.925         | 1                   |
| In | 37.58          | 0.99                |
| S  | 10.375         | 0.99                |
| Se | 29.475         | 1.13                |

Elemental chemical analysis of the pigment revealed it to have the composition:

|    | Weight Percent | Atomic Proportions |
|----|----------------|---------------------|
| Cu | 0.87           | 1                   |
| In | 1.53           | 0.97                |
| S  | 0.775          | 1.77                |
| Se | 57.355         | 53.02               |
| Zn | 43.105         | 48.13               |

X-ray diffraction analysis of the pigment revealed that it had the crystal lattice of zinc selenide.

EXAMPLE 2

The following components were admixed with stirring in a 250 ml beaker:

| Component | Amount |
|-----------|--------|
| Water | 103 ml |
| Zinc nitrate hexahydrate | 39.58 g |
| Cupric nitrate trihydrate | 0.29 g |
| Indium nitrate hydrate (31.1% w./w. In) | 0.44 g |

The mixture was heated to 40° C. to aid dissolution.

The following components were placed in a 100 ml beaker:

| Component | Amount |
|-----------|--------|
| Water | 20 ml |
| Sodium hydroxide | 11.08 g |
| Selenium powder | 10.72 g |
| Sulphur powder | 2.18 g |

The mixture was heated to 80° C. to aid dissolution.

The alkaline sulphoselenide solution was added dropwise to the mixed nitrate solution whilst stirring vigorously, over a period of about 10 minutes. Small volumes of water were also added during the addition to reduce any increase in viscosity of the mixture. Upon addition of the alkaline sulphoselenide solution, the mixture immediately changed from a very pale blue solution to a bright orange precipitate.

After the addition was complete, the precipitate was filtered under vacuum, washed with 10 liters of demineralised water and dried at 85° C. for 15 hours. After drying, the brown-coloured material was lightly ground, and in a furnace heated at 5° C. per minute and fired at 900° C. for about 30 minutes in an evacuated quartz ampoule until a solid solution was obtained. On cooling at 2° C. per minute back to room temperature, a pigment resulted comprising a solid solution of a zinc selenide host having a dopant of copper, indium, selenium and sulphur. The pigment had a bright orange colour.

Elemental chemical analysis of the pigment revealed it to have the composition:

|    | Weight Percent | Atomic Proportions |
|----|----------------|---------------------|
| Cu | 0.375          | 1                   |
| In | 0.725          | 1.07                |
| S  | 1.945          | 10.29               |
| Se | 54.675         | 117.32              |
| Zn | 43.015         | 111.49              |

X-ray diffraction analysis revealed that the material had the crystal lattice of zinc selenide.

EXAMPLES 3-11

Following the procedure of Example 1 but calcining at about 950° C. for 10 hours, a series of pigments was prepared which were zinc selenide containing in solid solution 0.25, 0.5, 0.75, 1.0, 1.5, 2.0, 2.5, 3.0 and 5.0, mole percent of the copper-indium-sulphoselenide dopant. The colour of the series of pigments ranged from orange (in the case of the pigment containing 0.25 mole percent of the dopant in the solid solution), through red, to bluish maroon (in the case of the pigment containing 5 mole percent of the dopant in the solid solution). The CIElab colour co-ordinates of the pigments are shown in the following Table, together, for comparison, with those of the zinc selenide host. The Table shows also the band gap energies of the pigments estimated from the mid point of their graphs of reflectance plotted against wavelength, and of zinc selenide taken from the literature. In addition, the table shows this mid point wavelength, in nanometers.

The pigments containing 2.0 and 3.0 mole percent dopant were submitted to X-ray diffraction analysis, which revealed that they had the crystal lattice of zinc selenide.

TABLE

| Example | Pigment | | Lightness | Chroma | Hue Angle, ° | Band Gap, eV | Wave length, nm |
|---|---|---|---|---|---|---|---|
| | ZnSe | Dopant mol, % | | | | | |
| | ZnSe | 0 | 79.73 | 64.33 | 91.67 | 2.63 | 471 |
| 3 | | + 0.25 | 53.36 | 56.03 | 50.55 | 2.06 | 599 |
| 4 | | + 0.5 | 48.92 | 53.36 | 44.18 | 2.05 | 609 |
| 5 | | + 0.75 | 45.90 | 49.70 | 40.87 | 2.05 | 604 |
| 6 | | + 1.0 | 44.28 | 49.93 | 35.42 | 2.04 | 611 |
| 7 | | + 1.5 | 40.17 | 39.28 | 31.35 | 2.05 | 604 |
| 8 | | + 2.0 | 35.36 | 33.92 | 25.43 | 2.00 | 618 |
| 9 | | + 2.5 | 34.24 | 30.44 | 20.95 | 1.94 | 643 |
| 10 | | + 3.0 | 31.50 | 24.66 | 18.41 | 1.91 | 653 |
| 11 | | + 5.0 | 27.67 | 4.55 | 357.82 | 1.83 | 678 |

EXAMPLE 12

The pigment of Example 2 was dispersed into resin, and injection moulded at 220° C. to form a sheet of coloured crystal polystyrene containing the pigment at a loading of 1% by weight. Its CIElab colour co-ordinates were then measured as follows: Lightness 45.15, chroma 36.54 and hue angle 45.52. Its band gap energy estimated from the mid point of a graph of its reflectance plotted against wavelength was 2.15 eV.

EXAMPLE 13

The dopant silver-indium-sulphide $AgInS_2$ was prepared by intimately mixing 1.239 g of silver sulphide $Ag_2S$ and 1.629 g of indium sulphide $In_2S_3$ using an agate mortar and pestle, and calcining the mixture in an evacuated quartz ampoule at 900° C. for 10 hours, using a heating and cooling rate of 5° C. per minute. 0.082 g of the resulting powder was then intimately mixed with 2.021 g of zinc selenide in an agate mortar and pestle. About 1.5 g of the mixture was placed in a quartz ampoule which was then evacuated. The mixture was calcined in a furnace at about 950° C. for 10 hours, using a heating and cooling rate of 5° C. per minute. After cooling, the ampoule was opened. An orange pigment was produced, whose CIElab colour co-ordinates were: Lightness 43.78, chroma 46.63 and hue angle 44.49. Its band gap energy, estimated from the mid point of a graph of its reflectance plotted against wavelength, was 2.06 eV.

EXAMPLE 14

Silver sulphide $Ag_2S$ (0.037 g), indium sulphide $In_2S_3$ (0.016 g), indium selenide $In_2Se_3$ (0.047 g) and zinc selenide ZnSe (2.021 g) were intimately mixed using an agate mortar and pestle. The mixture was calcined in an evacuated quartz ampoule in a furnace at 850° C. for 14 hours, using a heating and cooling rate of 5° C. per minute. After cooling, the ampoule was opened. An orange pigment was produced.

EXAMPLE 15

The dopant copper-indium-sulphoselenide CuInSSe was prepared by intimately mixing 0.286 g of cuprous sulphide, 0.196 g of indium sulphide and 0.560 g of indium selenide using an agate mortar and pestle, and calcining the mixture in an evacuated quartz ampoule at a temperature of 900° C. for 10 hours, using a heating rate of 5° C. per minute and a cooling rate of 2° C. per minute.

The zinc selenosulphide host lattice $ZnS_{0.5}Se_{0.5}$ was prepared by intimately mixing 1.823 g of zinc selenide and 1.231 g of zinc sulphide using an agate mortar and pestle, and calcining the mixture in an evacuated quartz ampoule at 900° C. for 10 hours, using a heating rate of 5° C. per minute and a cooling rate of 2° C. per minute. This yielded 3.010 g of powder.

0.0721 g of the dopant and 3.010 g of the host were intimately mixed using an agate mortar and pestle, and then placed in a quartz ampoule which was then evacuated. The mixture was calcined in a furnace at about 950° C. for 10 hours, using a heating rate of 5° C. per minute and a cooling rate of 2° C. per minute. After cooling, the ampoule was opened. A bright golden yellow pigment was produced. Its CIElab colour co-ordinates were: Lightness 58.84, chroma 62.54 and hue angle 59.59. Its band gap energy estimated from the mid point of its graph of reflectance plotted against wavelength was 2.16 eV. This mid point wavelength was 568 nanometres. The X-ray diffraction pattern of the material was as expected for the present solid solution.

EXAMPLE 16

The zinc selenosulphide host lattice $ZnSe_{0.67}S_{0.33}$ was prepared by intimately mixing 0.487 g of zinc sulphide and 1.443 g of zinc selenide using an agate mortar and pestle, and calcining the mixture in an evacuated quartz ampoule at 900° C. for 10 hours, using a heating rate of 5° C. per minute and a cooling rate of 2° C. per minute. This yielded 1.727 g of powder.

This powder and 0.0259 g of the dopant prepared in Example 15 were intimately mixed using an agate mortar and pestle, and then placed in a quartz ampoule which was then evacuated. The mixture was calcined in a furnace at about 950° C. for 10 hours, using a heating rate of 5° C. per minute and a cooling rate of 2° C. per minute. After cooling, the ampoule was opened. A bright golden yellow pigment was produced. Its CIElab colour co-ordinates were: Lightness 58.32, chroma 64.97 and hue angle 57.89. Its band gap energy estimated from the mid point of its graph of reflectance plotted against wavelength was 2.18 eV. This mid point wavelength was 572 nanometres. The X-ray diffraction pattern of the material was as expected for the present solid solution.

EXAMPLES 17-18

The dopant silver-indium-sulphoselenide, AgInSSe, was prepared by intimately mixing 0.743 g silver sulphide, 0.933 g indium selenide and 0.326 g indium sulphide, using an agate mortar and pestle, and calcining the mixture in an evacuated quartz ampoule at a temperature of about 900° C. for 10 hours, using a heating rate of 5° C. per minute and a cooling rate of 2° C. per minute. This yielded about 2.0 g of a homogeneous black powder. Two pigments were then prepared, which were zinc selenide containing in solid solution 2.0 and 5.0 mole percent of this dopant. The two pigments were prepared by intimately mixing 0.094 g AgInSSe with 2.000 g ZnSe, and 0.236 g AgInSSe with 1.939 g ZnSe respectively, and then calcining the mixtures in evacuated quartz ampoules at a temperature of about 850° C. for 5 hours, using a heating and cooling rate of 10° C. per minute. After cooling, the ampoules were opened and the contents lightly broken up to produce coloured pigment powders. The 2 mole percent sample was orange and the 5 mole percent sample red. The CIElab colour coordinates of the pigments are shown in the following Table, along with the band gap energies of the pigments.

nates of the pigments are shown in the following Table, along with the band gap energies of the pigments.

| Example | Pigment Dopant mol % | Lightness | Chroma | Hue Angle, ° | Band Gap, eV | Wave Length, nm |
|---|---|---|---|---|---|---|
| 21 | ZnSe + 2.0 | 82.12 | 81.18 | 86.38 | 2.47 | 501 |
| 22 | + 5.0 | 82.44 | 77.96 | 87.37 | 2.49 | 498 |

X-Ray Diffraction analysis of the 2 mole percent sample revealed that it had the esential crystal lattice of ZnSe.

EXAMPLES 23-24

Using the method of Examples 17-18, the dopant silver-gallium-sulphide, $AgGaS_2$, was prepared by combining 1.033 g silver sulphide and 0.982 g gallium suphide. This produced a pale green powder which was then doped at 2.0 and 5.0 mole percent into zinc selenide, by combining 0.068 g $AgGaS_2$ with 2.000 g ZnSe, and 0.171 g $AgGaS_2$ with 1.939 g ZnSe respectively. After firing, the ampoules were opened and the contents lightly broken up to produce an orange pigment powder in the case of the 2 mole percent sample, and a darker orange pigment powder in the case of the 5 mole percent sample. The CIElab colour coordinates of the pigments are shown in the following Table, along with the band gap energies of the pigments.

| Example | Pigment Dopant mol % | Lightness | Chroma | Hue Angle, ° | Band Gap, eV | Wave Length, nm |
|---|---|---|---|---|---|---|
| 17 | ZnSe + 2.0 | 53.57 | 55.30 | 46.18 | 2.18 | 568 |
| 18 | + 5.0 | 39.76 | 39.34 | 26.63 | 2.04 | 609 |

X-Ray Diffraction analysis of the 2 mole percent sample revealed that it had the essential crystal lattice of ZnSe.

EXAMPLES 19-20

Using the method of Examples 17-18, the dopant lithium-indium-sulphoselenide, LiInSSe, was prepared by combining 0.197 g lithium sulphide, 1.333 g indium selenide and 0.466 g indium sulphide. This produced a brown coloured powder which was then doped at 2.0 and 5.0 mole percent into zinc selenide, by combining 0.066 g LiInSSe with 2.000 g ZnSe, and 0.165 g LiInSSe with 1.939 g ZnSe repectively. After firing, the ampoules were opened and the contents lightly broken up to produce a bright orange-yellow pigment powder in the case of the 2 mole percent sample, and an orange pigment powder in the case of the 5 mole percent sample. The CIElab colour coordinates of the pigments are shown in the following Table, along with the band gap energies of the pigments.

| Example | Pigment Dopant mol % | Lightness | Chroma | Hue Angle, ° | Band Gap, eV | Wave Length, nm |
|---|---|---|---|---|---|---|
| 23 | ZnSe + 2.0 | 59.15 | 54.90 | 57.87 | 2.24 | 551 |
| 24 | + 5.0 | 51.64 | 53.26 | 41.40 | 2.13 | 580 |

X-Ray Diffraction analysis of the 2 mole percent sample revealed that it had the essential crystal lattice of ZnSe.

EXAMPLE 25

Using the method of Example 17-18, the dopant copper-gallium-sulphide, $CuGaS_2$, was prepared by combining 0.796 g cuprous sulphide and 1.178 g gallium sulphide. This produced a dark green powder which was then doped at 5.0 mole percent into zinc selenide, by combining 0.140 g $CuGaS_2$ with 1.939 g ZnSe. After firing, the ampoule was opened and the contents lightly broken up to produce a maroon pigment powder. Its CIElab colour coordinates were: Lightness 37.68, Chroma 21.58 and Hue angle 22.20. Its band gap energy was estimated to be 2.07 eV and its midpoint wavelength 598 nm.

EXAMPLES 26-27

Using the method of Examples 17-18, the dopant copper-silver-lithium-indium-gallium-sulphoselenide, $Cu_{\frac{1}{4}}Ag_{\frac{1}{4}}Li_{\frac{1}{4}}In_{\frac{3}{4}}Ga_{\frac{1}{4}}SSe$, was prepared by combining 0.106 g cuprous sulphide, 0.165 g silver sulphide, 0.031 g lithium sulphide, 0.622 g indium selenide and 0.157 g gallium sulphide. This produced a black powder which was doped at 2.0 and 5.0 mole percent into zinc selenide, by combining 0.076 g $Cu_{\frac{1}{4}}Ag_{\frac{1}{4}}Li_{\frac{1}{4}}In_{\frac{3}{4}}Ga_{\frac{1}{4}}SSe$ with 2.000 g ZnSe, and 0.158 g $Cu_{\frac{1}{4}}Ag_{\frac{1}{4}}Li_{\frac{1}{4}}In_{\frac{3}{4}}Ga_{\frac{1}{4}}SSe$ with 1.934 g ZnSe respectively. After firing, the ampoules were opened and the contents lightly broken up to produce an orange pigment powder in the case of the 2 mole percent sample, and a light red pigment powder in the case of the 5 mole percent sample. The CIElab colour coordinates of the pigments are shown in the following Table, along with the band gap energies of the pigments.

EXAMPLES 21-22

Using the method of Examples 17-18, the dopant lithium-gallium-sulphide, $LiGaS_2$, was prepared by combining 0.328 g lithium sulphide and 1.683 g gallium sulphide. This produced a white powder which was then doped at 2.0 and 5.0 mole percent into zinc selenide, by combining 0.040 g $LiGaS_2$ with 2.000 g ZnSe, and 0.100 g $LiGaS_2$ with 1.939 g ZnSe repectively. After firing, the ampoules were opened and the contents lightly broken up to produce bright yellow pigment powders in both cases. The CIElab colour coordi-

| Example | Pigment Dopant mol % | Lightness | Chroma | Hue Angle, ° | Band Gap, eV | Wave Length, nm |
|---|---|---|---|---|---|---|
| 19 | ZnSe + 2.0 | 68.18 | 73.80 | 69.54 | 2.32 | 533 |
| 20 | + 5.0 | 55.01 | 61.02 | 54.70 | 2.07 | 599 |

X-Ray Diffraction analysis of the 2 mole percent sample revealed that it had the essential crystal lattice of ZnSe.

| Example | Pigment Dopant mol % | Lightness | Chroma | Hue Angle, ° | Band Gap, eV | Wave Length, nm |
|---|---|---|---|---|---|---|
| 26 | ZnSe + 2.0 | 52.92 | 60.67 | 48.78 | 2.12 | 583 |
| 27 | + 5.0 | 42.79 | 45.56 | 35.46 | 2.07 | 599 |

X-Ray Diffraction analysis of the 2 mole percent sample revealed that it had the essential crystal lattice of ZnSe.

EXAMPLES 28–33

Using the method of Examples 17–18, two copper-indium-sulphoselenide dopants were prepared with an excess of sulphur. The two dopants were $CuInSeS_{7/6}$ and $CuInSeS_{3/2}$.

$CuInSeS_{7/6}$ was prepared by combining 0.128 g cupric sulphide, 0.212 g cuprous sulphide, 0.217 g indium sulphide and 0.622 g indium selenide. This produced a black powder which was then doped at 1.0, 2.0 and 3.0 mole percent into zinc selenide, by combining 0.042 g $CuInSeS_{7/6}$ with 2.020 g ZnSe, 0.083 g $CuInSeS_{7/6}$ with 2.000 g ZnSe and 0.125 g $CuInSeS_{7/6}$ with 0.198 g ZnSe respectively. After firing, the ampoules were opened and the contents lightly broken up to produce an orange pigment powder in the case of the 1 mole percent sample, a light red pigment powder in the case of the 2 mole percent sample and a dark red pigment powder in the case of the 3 mole percent sample. The CIElab colour coordinates of the pigments are shown in the Table below, along with the band gap energies of the pigments.

$CuInSeS_{3/2}$ was prepared by combining 0.382 g cupric sulphide, 0.217 g indium sulphide and 0.622 g indium selenide. This produced a black powder which was then doped at 1.0, 2.0 and 3.0 mole percent into zinc selenide, by combining 0.043 g $CuInSeS_{3/2}$ with 2.020 g ZnSe, 0.086 g $CuInSeS_{3/2}$ with 2.000 g ZnSe and 0.130 g $CuInSeS_{3/2}$ with 1.980 g ZnSe respectively. After firing, the ampoules were opened and the contents lightly broken up to produce an orange pigment powder in the case of the 1 mole percent sample, a light red pigment powder in the case of the 2 mole percent sample, and a dark red pigment powder in the case of the 3 mole percent sample. The CIElab colour coordinates of the pigments are shown in the Table below, along with the band gap energies of the pigments.

EXAMPLES 34–36

Using the method of Examples 17–18, the dopant copper-indium-sulphide, $CuInS_2$, was prepared by combining 0.398 g cuprous sulphide and 0.815 g indium sulphide. This produced a black powder which was then doped at 1.0, 2.0 and 3.0 mole percent into zinc selenide, by combining 0.034 g $CuInS_2$ with 2.020 g ZnSe, 0.069 g $CuInS_2$ with 2.000 g ZnSe and 0.103 g $CuInS_2$ with 1.978 g ZnSe respectively. After firing, the ampoules were opened and the contents lightly broken up to produce an orange pigment powder in the case of the 1 mole percent sample, a red pigment powder in the case of the 2 mole percent sample, and a maroon pigment powder in the case of the 3 mole percent sample. The CIElab colour coordinates of the pigments are shown in the Table below, along with the band gap energies of the pigments.

| Example | Pigment Dopant mol % | Lightness | Chroma | Hue Angle, ° | Band Gap, eV | Wave Length, nm |
|---|---|---|---|---|---|---|
| 34 | ZnSe + 1.0 | 51.86 | 53.89 | 40.74 | 2.12 | 584 |
| 35 | + 2.0 | 42.01 | 35.69 | 25.96 | 2.03 | 613 |
| 36 | + 3.0 | 36.85 | 24.08 | 19.75 | 1.98 | 628 |

EXAMPLES 37–39

Using the method of Examples 17–18, the dopant copper-indium-sulphoselenide, $CuInS_{1.5}Se_{0.5}$, was prepared by combining 0.318 g cuprous sulphide, 0.434 g indium sulphide and 0.311 g indium selenide. This produced a black powder which was then doped at 1.0, 2.0 and 3.0 mole percent into zinc selenide, by combining 0.038 g $CuInS_{1.5}Se_{0.5}$ with 2.020 g ZnSe, 0.075 g $CuInS_{1.5}Se_{0.5}$ with 2.000 g ZnSe and 0.113 g $CuInS_{1.5}Se_{0.5}$ with 1.980 g ZnSe respectively. After firing, the ampoules were opened and the contents lightly broken up to produce an orange pigment powder in the case of the 1 mole percent sample, a red pigment powder in the case of the 2 mole percent sample, and a maroon pigment powder in the case of the 3 mole percent sample. The CIElab colour coordinates of the pigments are shown in the Table below, along with the band gap energies of the pigments.

| Example | Mole % Dopant | Lightness | Chroma | Hue Angle, ° | Band Gap, eV | Wave Length, nm |
|---|---|---|---|---|---|---|
| | $CuInSeS_{7/6}$ | | | | | |
| 28 | 1.0 | 51.00 | 55.41 | 36.95 | 2.06 | 604 |
| 29 | 2.0 | 40.49 | 38.07 | 25.98 | 1.97 | 630 |
| 30 | 3.0 | 33.80 | 23.46 | 18.98 | 1.88 | 660 |
| | $CuInSeS_{3/2}$ | | | | | |
| 31 | 1.0 | 51.48 | 60.99 | 43.17 | 2.05 | 606 |
| 32 | 2.0 | 42.11 | 49.06 | 33.63 | 1.98 | 629 |
| 33 | 3.0 | 34.84 | 37.03 | 26.70 | 1.92 | 648 |

| Example | Pigment Dopant mol % | Lightness | Chroma | Hue Angle, ° | Band Gap, eV | Wave Length, nm |
|---|---|---|---|---|---|---|
| 37 | ZnSe + 1.0 | 51.81 | 51.72 | 39.19 | 2.10 | 588 |
| 38 | + 2.0 | 41.55 | 36.53 | 26.16 | 2.04 | 610 |
| 39 | + 3.0 | 35.80 | 21.08 | 17.44 | 1.97 | 631 |

EXAMPLES 40–42

Using the method of Examples 17–18, the dopant copper-indium-sulphoselenide, $CuInS_{0.5}Se_{1.5}$, was prepared by combining 0.265 g cuprous sulphide and 0.778 g indium selenide. This produced a black powder which was then doped at 1.0, 2.0 and 3.0 mole percent into zinc selenide, by combining 0.44 g $CuInS_{0.5}Se_{1.5}$ with 2.020 g ZnSe, 0.089 g $CuInS_{0.5}Se_{1.5}$ with 2.000 g ZnSe and 0.133 g $CuInS_{0.5}Se_{1.5}$ with 0.198 g ZnSe respectively. After firing, the ampoules were opened and the contents lightly broken up to produce an orange pigment powder in the case of the 1 mole percent sample, a red pigment powder in the case of the 2 mole percent sample, and a maroon pigment powder in the case of the 3 mole percent sample. The CIElab colour coordinates of the pigments are shown in the Table below, along with the band gap energies of the pigments.

| Example | Pigment Dopant mol % | Lightness | Chroma | Hue Angle, ° | Band Gap, eV | Wave Length, nm |
|---|---|---|---|---|---|---|
| 40 | ZnSe + 1.0 | 51.30 | 51.69 | 40.45 | 2.14 | 578 |
| 41 | + 2.0 | 39.85 | 36.36 | 26.64 | 2.04 | 609 |
| 42 | + 3.0 | 34.11 | 18.31 | 16.54 | 1.96 | 634 |

EXAMPLE 43

Using the method of Examples 17–18, the dopant copper-indium-selenide, $CuInSe_2$, was prepared by combining 0.294 g cuprous selenide and 0.667 g indium selenide. This produced a black powder which was then doped at 2.0 mole percent into zinc selenide, by combining 0.048 g $CuInSe_2$ with 1.000 g ZnSe. After firing, the ampoule was opened and the contents lightly broken up to produce a bright red pigment powder. The CIElab colour coordinates of the pigment were: Lightness 38.92, Chroma 34.19 and Hue angle 26.60. Its band gap energy was estimated to be 2.03 eV and its midpoint wavelength 612 nm.

EXAMPLES 44–47

Following the procedure of Example 1 but calcining at about 950° C. for 10 hours, a series of pigments was prepared which was zinc selenide containing in solid solution 0.05, 0.1, 0.15 and 0.2 mole percent of copper-indium-sulphoselenide dopant. After firing, the ampoules were opened and the contents lightly broken up. The colour of the pigment powders ranged from bright golden yellow (in the case of the pigment containing 0.05 mole percent of the dopant in solid solution) to orange (in the case of the pigment containing 0.2 mole percent of the dopant in solid solution). The CIElab colour coordinates of the pigments are shown in the following Table, along with their band gap energies.

| Example | Pigment Dopant mol % | Lightness | Chroma | Hue Angle, ° | Band Gap, eV | Wave Length, nm |
|---|---|---|---|---|---|---|
| 44 | ZnSe + 0.05 | 68.11 | 76.22 | 62.76 | 2.18 | 569 |
| 45 | + 0.10 | 66.15 | 77.46 | 59.25 | 2.15 | 577 |
| 46 | + 0.15 | 62.15 | 68.85 | 57.21 | 2.13 | 580 |
| 47 | + 0.20 | 61.93 | 68.74 | 56.01 | 2.12 | 581 |

EXAMPLE 48

The dopant, $CuIn_{1.04}S_{2.06}$, was prepared by intimately mixing 0.309 g of cuprous sulphide and 0.658 g of indium sulphide using an agate mortar and pestle, and calcining the mixture in an evacuated quartz ampoule at a temperature of about 900° C. for 10 hours, using a heating rate of 5° C. per minute and a cooling rate of 2° C. per minute. This yielded about 1.0 g of a homogeneous black powder. 0.034 g of this powder was then intimately mixed with 1.000 g of zinc selenide using an agate mortar and pestle. This mixure was placed in a quartz ampoule which was then evacuated. The mixture was calcined in a furnace at a temperature of 850° C. for 5 hours, using a heating and cooling rate of 10° C. per minute. After cooling, the ampoule was opened and the contents lightly broken up. This produced a bright red pigment powder. The pigment was zinc selenide containing 2 mole percent of the dopant. The CIElab colour coordinates of the pigment powder were: Lightness 40.11, Chroma 39.99 and Hue angle 27.65. Its band gap energy was estimated to be 1.97 eV and its midpoint wavelength 631 nm.

EXAMPLES 49–59

Following the procedure of Example 48, a series of pigments was prepared with dopants of composition $CuIn_{1.85}S_{3.28}$, $CuIn_{1.57}S_{2.86}$, $CuIn_{1.42}S_{2.63}$, $CuIn_{1.35}S_{2.53}$, $CuIn_{1.23}S_{2.35}$, $CuIn_{1.08}S_{2.13}$, $CuIn_{0.96}S_{1.94}$, $CuIn_{0.92}S_{1.88}$, $CuIn_{0.83}S_{1.74}$, $CuIn_{0.77}S_{1.65}$ and $CuIn_{0.69}S_{1.54}$. These dopants were calcined with ZnSe to produce pigments each containing 2 mole percent of dopant. The colours of the pigment powders were as given below. (See Table for Example numbers). Example 49 was red, Example 50 was a deep orange, Examples 51–54 were red and Examples 55–59 were brown. The CIElab colour coordinates of the pigments are shown in the following Table, along with the band gap energies of the pigments.

| Example | Pigment 98 mol % ZnSe + 2 mol % dopant Dopant | Lightness | Chroma | Hue Angle, ° | Band Gap, eV | Wave Length, nm |
|---|---|---|---|---|---|---|
| 49 | $CuIn_{1.85}S_{3.28}$ | 37.70 | 38.75 | 30.59 | 1.94 | 642 |
| 50 | $CuIn_{1.57}S_{2.86}$ | 42.31 | 38.49 | 34.50 | 1.94 | 642 |
| 51 | $CuIn_{1.42}S_{2.63}$ | 40.11 | 39.26 | 27.36 | 1.97 | 631 |
| 52 | $CuIn_{1.35}S_{2.53}$ | 39.30 | 37.19 | 25.66 | 1.96 | 633 |
| 53 | $CuIn_{1.23}S_{2.35}$ | 40.72 | 39.94 | 28.78 | 1.98 | 629 |
| 54 | $CuIn_{1.08}S_{2.13}$ | 39.13 | 40.27 | 29.04 | 1.97 | 631 |
| 55 | $CuIn_{0.96}S_{1.94}$ | 38.82 | 36.01 | 28.76 | 2.04 | 607 |
| 56 | $CuIn_{0.92}S_{1.88}$ | 40.93 | 34.32 | 28.36 | 2.06 | 602 |
| 57 | $CuIn_{0.83}S_{1.74}$ | 37.92 | 29.97 | 26.72 | 2.06 | 602 |
| 58 | $CuIn_{0.77}S_{1.65}$ | 42.77 | 31.17 | 30.10 | 2.11 | 587 |
| 59 | $CuIn_{0.69}S_{1.54}$ | 45.04 | 34.37 | 33.75 | 2.11 | 587 |

EXAMPLE 60

The dopant, $CuInS_{1.98}O_{0.02}$, was prepared by intimately mixing 0.012 g cuprous oxide with 0.316 g cuprous sulphide and 0.673 g indium sulphide using an agate mortar and pestle and calcining the mixture in an evacuated quartz ampoule at a temperature of about 900° C. for 10 hours, using a heating rate of 5° C. per minute and a cooling rate of 2° C. per minute. This yielded about 1.0 g of a homogeneous black powder. 0.069 g of this powder was intimately mixed with 2.000 g of zinc selenide using an agate mortar and pestle. This mixture was placed in a quartz ampoule, which was then evacuated. The mixture was calcined in a furnace at a temperature of about 850° C. for 5 hours, using a heating and cooling rate of 10° C. per minute. After cooling, the ampoule was opened and the contents lightly broken up. This produced a bright red pigment powder. The pigment was zinc selenide containing 2 mole percent of the dopant. The CIElab colour coordinates of the pigment powder were: Lightness 45.36, Chroma 39.50 and Hue angle 29.98. Its band gap energy was estimated to be 2.04 eV and its midpoint wavelength 610 nm.

EXAMPLES 61-64

Following the procedure of Example 60, a series of pigments was prepared with dopants of composition $CuInS_{1.9}O_{0.1}$, $CuInS_{1.8}O_{0.2}$, $CuInS_{1.5}O_{0.5}$ and $CuInO_2$. These dopants were calcined with ZnSe to produce pigments each containing 2 mole percent of dopant. The pigment powders were all bright red. The CIElab colour coordinates of the pigments are shown in the following Table, along with the band gap energies of the pigments.

| Example | Pigment 98 mol % ZnSe + 2 mol % dopant Dopant | Lightness | Chroma | Hue Angle, ° | Band Gap, eV | Wave Length, nm |
|---|---|---|---|---|---|---|
| 61 | $CuInS_{1.9}O_{0.1}$ | 43.18 | 40.51 | 26.38 | 2.00 | 621 |
| 62 | $CuInS_{1.8}O_{0.2}$ | 41.92 | 37.94 | 24.22 | 1.99 | 624 |
| 63 | $CuInS_{1.5}O_{0.5}$ | 40.78 | 37.04 | 26.72 | 2.05 | 604 |
| 64 | $CuInO_2$ | 42.64 | 40.62 | 25.68 | 2.01 | 620 |

EXAMPLE 65

The dopant, $CuInO_2$, was prepared by the procedure described in Example 64. The host, $ZnSe_{0.9}O_{0.1}$, was prepared by intimately mixing 0.118 g zinc oxide with 1.883 g zinc selenide in an agate mortar and pestle and calcining the mixture in an evacuated quartz ampoule at about 900° C. for 10 hours using a heating rate of 5° C. per minute and a cooling rate of 2° C. per minute. This yielded about 2.0 g of a yellow powder. 1.00 g of this powder was intimately mixed with 0.031 g of the dopant in an agate mortar and pestle. This mixture was placed in a quartz ampoule, which was then evacuated. The mixuture was calcined in a furance at about 850° C. for 5 hours, using a heating and cooling rate of 10° C. per minute. After cooling, the ampoule was opened and the contents lightly broken up. This yielded a red pigment powder. The CIElab colour coordinates of the pigment powder were: Lightness 40.74, Chroma 34.55 and Hue angle 23.33. Its band gap energy was estimated to be 1.98 eV and its midpoint wavelength 631 nm.

EXAMPLES 66-67

Following the procedure of Example 65, pigments were prepared with hosts of composition $ZnSe_{0.75}O_{0.25}$ and $ZnSe_{0.5}O_{0.5}$. These hosts were calcined with $CuInO_2$ to produce pigments each containing 2 mole percent of dopant. The former was a brown-red colour and the latter was a mauve colour. The CIElab colour coordinates of the pigments are shown in the following Table, along with the band gap energies of the pigments.

| Example | Pigment 98 mol % host + 2 mol % $CuInO_2$ Host | Lightness | Chroma | Hue Angle, ° | Band Gap, eV | Wave Length, nm |
|---|---|---|---|---|---|---|
| 66 | $ZnSe_{0.75}O_{0.25}$ | 44.67 | 27.84 | 21.66 | 1.96 | 633 |
| 67 | $ZnSe_{0.5}O_{0.5}$ | 51.42 | 13.82 | 18.82 | — | — |

EXAMPLE 68

The zinc selenosulphide host lattice $ZnSe_{0.33}S_{0.67}$ was prepared by intimately mixing 1.110 g of zinc selenide and 1.500 g of zinc sulphide using an agate mortar and pestle, and calcining the mixture in an evacuated quartz ampoule at about 900° C. for 10 hours, using a heating rate of 5° C. per minute and a cooling rate of 2° C. per minute.

1.330 g of the resultant powder and 0.070 g of the dopant prepared in Example 15 were intimately mixed using an agate mortar and pestle, and then placed in a quartz ampoule which was then evacuated. The mixture was calcined in a furnace at about 850° C. for 5 hours, using a heating and cooling rate of 10° C. per minute. After cooling, the ampoule was opened and the contents lightly broken up to produce a light orange pigment powder. Its CIElab colour coordinates were: Lightness 59.63, Chroma 53.89 and Hue angle 60.75. Its band gap energy was estimated to be 2.21 eV and its midpoint wavelength 560 nm.

EXAMPLE 69

The zinc selenosulphide host lattice $ZnSe_{0.5}S_{0.5}$ was prepared by intimately mixing 1.443 g of zinc selenide and 0.974 g of zinc sulphide using an agate mortar and pestle, and calcining the mixture in an evacuated quartz ampoule at 900° C. for 10 hours, using a heating rate of 5° C. per minute and a cooling rate of 2° C. per minute.

1.422 g of the resultant powder and 0.070 g of the dopant prepared in Example 15 were intimately mixed using an agate mortar and pestle, and then placed in a quartz ampoule which was then evacuated. The mixture was calcined in a furnace at about 850° C. for 5 hours, using a heating and cooling rate of 10° C. per minute. After cooling, the ampoule was opened and the contents lightly broken up to produce on orange pigment powder. Its CIElab colour coordinates were: Lightness 54.10, Chroma 47.34 and Hue angle 51.41. Its band gap energy was estimated to be 2.18 eV and its midpoint wavelength 567 nm.

EXAMPLE 70

The zinc selenosulphide host lattice $ZnSe_{0.67}S_{0.33}$ was prepared by intimately mixing 1.924 g of zinc selenide and 0.650 g of zinc sulphide using an agate mortar and pestle, and calcining the mixture in an evacuated quartz ampoule at about 900° C. for 10 hours, using a heating rate of 5° C. per minute and a cooling rate of 2° C. per minute.

1.514 g of the resultant powder and 0.070 g of the dopant prepared in Example 15 were intimately mixed using an agate mortar and pestle, and then placed in a quartz ampoule which was then evacuated. The mixture was calcined in a furnace at about 850° C. for 5 hours, using a heating and cooling rate of 10° C. per minute. After cooling, the ampoule was opened and the contents lightly broken up to produce a dark orange pigment powder. Its CIElab colour coordinates were: Lightness 50.10, Chroma 46.48 and Hue angle 43.59. Its band gap energy was estimated to be 2.13 eV and its midpoint wavelength 580 nm.

EXAMPLE 71

Zinc sulphate heptahydrate (11.502 g, 0.04 mole) was dissolved in water (25 ml). 35% sodium sulphide (2.972 g, 0.0134 mole) and selenium (2.118 g, 0.0268 mole) was dissolved in water (20 ml). These solutions were simultaneously added dropwise to a solution of $Na_2CO_3$ (2.84 g, 0.0268 mole) in water (25 ml) at 40° C. with stirring. The stirring was continued for 1 hour. The resultant orange-brown precipitate was suction filtered, washed with water and dried under vacuum at 90° C. for 10 hours, whereupon it became dark grey. The dried material was sealed in an evacuated quartz ampoule and then calcined at about 600° C. for 1 hour, using a heating and cooling rate of 10° C. per minute. This yielded a bright yellow powder, which was zinc selenide.

0.466 g of this powder and 0.020 g of the dopant prepared in Examples 31-33 were intimately mixed using an agate mortar and pestle, and then placed in a quartz ampoule which was then evacuated. The mixture was calcined in a furnace at about 850° C. for 5 hours, using a heating and cooling rate of 10° C. per minute. After cooling, the ampoule was opened and the contents lightly broken up to produce a red pigment powder. Its CIElab colour coordinates were: Lightness 54.94, Chroma 29.37 and Hue angle 55.20. Its band gap energy was estimated to be 2.06 eV and its midpoint wavelength 602 nm.

EXAMPLE 72

The following ingredients were placed in a 100 ml beaker:

| Ingredient | Amount |
| --- | --- |
| Water | 40 ml |
| Zinc sulphate heptahydrate | 5.693 g (0.0198 mole) |
| Standard copper solution | 1.02 ml (0.0001 mole of Cu) |
| Standard indium solution | 2.25 ml (0.0001 mole of In) |

The following ingredients were placed in a second 100 ml beaker:

| Ingredient | Amount |
| --- | --- |
| Water | 25 ml |
| Sodium Hydroxide (98%) | 1.633 g (0.04 mole) |
| Selenium Powder | 1.58 g (0.02 mole) |
| Sulphur Powder | 0.33 g (0.0103 mole) |

The sodium hydroxide solution was heated with stirring to 80° C. to dissolve the selenium and sulphur and the zinc solution was then added steadily to it over a period of two minutes. More water (30 ml) was added to reduce the viscosity. The temperature was reduced to 40° C. and the mixture was stirred at this new temperature for 1 hour. The resultant precipitant was suction filtered, washed with water until the filtrate reached constant conductivity and dried under vacuum at 100° C. The dry material was ground to a powder using an agate mortar and pestle, and placed in a quartz ampoule which was then evacuated. The material was calcined in a furnace at about 600° C. for 1 hour, using a heating and cooling rate of 10° C. per minute. After cooling, the ampoule was opened and the contents lightly broken up to produce an orange pigment powder. The pigment was zinc selenide containing 1 atomic percent of the dopant. Its CIElab colour coordinates were: Lightness 67.99, Chroma 71.34 and Hue angle 65.62. Its band gap energy was estimated to be 2.22 eV and its midpoint wavelength 557 nm.

EXAMPLE 73

The procedure of Example 72 was repeated, but the dry material was this time calcined at about 850° C. for 1 hour. The resultant pigment powder was an orange colour with CIElab colour coordinates: Lightness 61.04, Chroma 66.83 and Hue angle 50.40. Its band gap energy was estimated to be 2.12 eV and its midpoint wavelength 582 nm.

EXAMPLES 74-77

A series of materials with colours ranging from orange to maroon was prepared by the method of Example 72, differing only in the amounts of copper, indium and zinc used. The amounts relevant to each Example were:

| | | Amounts | |
|---|---|---|---|
| Example | Zinc Sulphate Heptahydrate | Standard Copper Solution | Standard Indium Solution |
| 74 | 5.578 g (0.0194 mole) | 3.065 ml (0.0003 mole) | 6.75 ml (0.0003 mole) |
| 75 | 5.521 g (0.0192 mole) | 4.09 ml (0.0004 mole) | 9.00 ml (0.0004 mole) |
| 76 | 5.406 g (0.0188 mole) | 6.13 ml (0.0006 mole) | 13.51 ml (0.0006 mole) |
| 77 | 5.291 g (0.0184 mole) | 8.17 ml (0.0008 mole) | 18.01 ml (0.0008 mole) |

The CIElab colour coordinates of the pigment powders produced are shown in the following Table, along with the band gap energies of the pigments.

| Example | Atomic % Dopant | Lightness | Chroma | Hue Angle, ° | Band Gap, eV | Wave Length, nm |
|---|---|---|---|---|---|---|
| 74 | 3 | 50.11 | 63.15 | 45.05 | 2.07 | 598 |
| 75 | 4 | 51.12 | 58.50 | 42.78 | 2.05 | 604 |
| 76 | 6 | 37.31 | 41.51 | 34.07 | 1.94 | 640 |
| 77 | 8 | 29.25 | 26.29 | 25.83 | 1.85 | 670 |

EXAMPLES 78-81

The procedures of Examples 74-77 were repeated, but the dry material was this time calcined at about 850° C. for 1 hour. The CIElab colour coordinates of the pigment powders produced are shown in the following Table, along with the band gap energies of the pigments.

| Example | Atomic % Dopant | Lightness | Chroma | Hue Angle, ° | Band Gap, eV | Wave Length, nm |
|---|---|---|---|---|---|---|
| 78 | 3 | 45.79 | 50.73 | 34.99 | 2.02 | 614 |
| 79 | 4 | 41.33 | 46.79 | 32.05 | 1.99 | 627 |
| 80 | 6 | 34.70 | 26.60 | 23.70 | 1.88 | 659 |
| 81 | 8 | 30.10 | 17.73 | 18.86 | 1.86 | 668 |

EXAMPLE 82

Following the procedure of Example 72, a zinc selenide based pigment was prepared containing 2 atomic percent dopant. The preparation differed from Example 72 in the amounts of copper, indium and zinc used. The amounts relevant to this Example were:

| Ingredient | Amount |
|---|---|
| Zinc sulphate heptahydrate | 5.636 g (0.0196 mole) |
| Standard copper solution | 2.04 ml (0.0002 mole) |
| Standard indium solution | 4.5 ml (0.0002 mole) |

The dry material was calcined at about 850° C. for 1 hour. This produced a dark orange coloured pigment powder. Its CIElab colour coordinates were: Lightness 52.75, Chroma 50.93 and Hue angle 42.63. Its band gap energy was estimated to be 2.05 eV and its midpoint wavelength 607 nm.

EXAMPLE 83

The procedure of Example 78 was repeated, except that the sodium hydroxide solution was added steadily to the zinc solution over a period of two minutes. The material was fired at 850° C. After cooling, the ampoule was opened and the contents lightly broken up to produce a red pigment powder. Its CIElab colour coordinates were: Lightness 43.37, Chroma 46.80 and Hue angle 32.91. Its band gap energy was estimated to be 2.01 eV and its midpoint wavelength 618 nm.

EXAMPLES 84-85

Using the method of Example 72, two pigments were prepared using an excess of indium and a deficiency of copper, so that the dopant was of the formula: $Cu_{1-3x}In_{1+x}S_2$. The relative amounts of copper, indium and zinc were varied in the two materials. The amount of metal salts used were:

| | | Amounts | | |
|---|---|---|---|---|
| Example | x | Zinc Sulphate Heptahydrate | Standard Copper Solution | Standard Indium Solution |
| 84 | 0.02 | 5.693 g (0.0198 mole) | 0.96 ml (0.000094 mole) | 2.30 ml (0.000102 mole) |
| 85 | 0.01 | 5.521 g (0.0192 mole) | 3.96 ml (0.000388 mole) | 9.09 ml (0.000404 mole) |

The materials were calcined in evacuated quartz ampoules at about 850° C. for 1 hour. The pigment of Example 84 was orange and that of Example 85 was red. The CIElab colour coordinates of the pigment powders are shown in the following Table, along with their band gap energies.

| Example | Atomic % Dopant | Lightness | Chroma | Hue Angle, ° | Band Gap, eV | Wave Length, nm |
|---|---|---|---|---|---|---|
| 84 | 1 | 52.00 | 54.85 | 49.92 | 2.04 | 610 |
| 85 | 4 | 42.62 | 48.12 | 33.61 | 2.01 | 620 |

EXAMPLES 86-89

The basic process described in Example 72 was repeated with various amounts of copper, indium and zinc, and using a 1% excess of selenium in each case. The weight of selenium used in each Example was 1.596 g (0.0202 mole). The quantities of metal salts were:

| | Amounts | | |
|---|---|---|---|
| Example | Zinc Sulphate Heptahydrate | Standard Copper Solution | Standard Indium Solution |
| 86 | 5.693 g (0.0198 mole) | 1.02 ml (0.0001 mole) | 2.25 ml (0.0001 mole) |
| 87 | 5.636 g (0.0196 mole) | 2.04 ml (0.0002 mole) | 4.50 ml (0.0002 mole) |
| 88 | 5.521 g (0.0192 mole) | 4.09 ml (0.0004 mole) | 9.00 ml (0.0004 mole) |
| 89 | 5.463 g (0.0190 mole) | 5.10 ml (0.0005 mole) | 11.25 ml (0.0005 mole) |

The materials were calcined in evacuated ampoules at about 650° C. for 1 hour, using a heating and cooling rate of 10° C. per minute. After cooling, the ampoules were opened and the contents lightly broken up, and then the materials were washed with aqueous sodium sulphide solution (2 g of 35% by weight $Na_2S$ in 50 ml water). This produced a range of golden yellow to red pigment powders. The small excess of selenium used gave improved colour characteristics to the materials. The CIElab colour coordinates of the pigment powders are shown in the following Table, along with the band gap energies of the pigments.

| Example | Atomic % Dopant | Lightness | Chroma | Hue Angle, ° | Band Gap, eV | Wave Length, nm |
|---|---|---|---|---|---|---|
| 86 | 1 | 69.89 | 73.25 | 62.27 | 2.20 | 562 |
| 87 | 2 | 59.13 | 71.47 | 51.92 | 2.13 | 582 |
| 88 | 4 | 46.36 | 48.89 | 35.90 | 2.01 | 618 |
| 89 | 5 | 43.28 | 43.52 | 30.90 | 1.99 | 627 |

EXAMPLE 90

The procedure of Examples 84-85 was repeated except that zinc nitrate hexahydrate was used in place of zinc sulphate heptahydrate. The following amounts of metal salts were used:

| Ingredient | Amount |
|---|---|
| Zinc nitrate hexahydrate | 5.711 g (0.0192 mole) |
| Standard copper solution | 3.99 ml (0.000391 mole) |
| Standard indium solution | 9.07 ml (0.000403 mole) |

The material was calcined in an evacuated quartz ampoule at 650° C. for 1 hour. After cooling, the ampoule was opened and the contents lightly broken up to produce an orange-red pigment powder. The pigment was zinc selenide containing in solid solution 4 atomic percent of the dopant $Cu_{1-3x}In_{1+x}Se_2$, where $x=0.0075$. The CIElab colour coordinates of the pigment were: Lightness 43.83, Chroma 58.17 and Hue angle 39.01. Its band gap energy was estimated to be 2.03 eV and its midpoint wavelength 614 nm.

EXAMPLE 91

The method of Example 90 was repeated except that zinc chloride (2.617 g, 0.0192 mole) was used in place of zinc nitrate hexahydrate. A red powder was produced with CIElab colour coordinates: Lightness 42.20, Chroma 44.72 and Hue angle 28.80. Its band gap energy was estimated to be 1.99 eV and its midpoint wavelength 624 nm.

EXAMPLE 92

Zinc oxide can be used as a starting material, but it must be dissolved in acid which is then neutralized during the reaction. For this Example, the following ingredients were placed in a 250 ml beaker:

| Ingredient | Amount |
|---|---|
| Water | 40 ml |
| Sodium hydroxide (98%) | 12.9 g (0.316 mole) |
| Selenium powder | 1.58 g (0.02 mole) |
| Sulphur powder | 0.33 g (0.0103 mole) |

The following ingredients were placed in a 100 ml beaker:

| Ingredient | Amount |
|---|---|
| Nitric acid (70%) | 20 ml (0.316 mole) |
| Zinc Oxide | 1.578 g (0.0192 mole) |
| Water | 30 ml |
| Standard copper solution | 3.99 ml (0.000391 mole) |
| Standard indium solution | 9.07 ml (0.000403 mole) |

The sodium hydroxide solution was briefly warmed to dissolved the selenium and sulphur and then, without heating, the zinc solution was added steadily to it, with good stirring. More water (30 ml) was added to reduce the viscosity and the pH was adjusted to about 6.5. The mixture was stirred for 1 hour and the precipitate was filtered, washed and dried as described in Example 72. It was calcined at about 650° C. for 1 hour, in an evacuated ampoule, to produce a red pigment powder, which was zinc selenide containing in solid solution 4 atomic percent of the dopant $Cu_{1-3x}In_{1+x}Se_2$ where $x=0.0075$. The CIElab colour coordinates of the pigment were measured as followed: Lightness 51.78, Chroma 60.78 and Hue angle 48.98. Its band gap energy was estimated to be 2.07 eV and its midpoint wavelength 599 nm.

EXAMPLE 93

The procedure of Example 92 was repeated except using 35% hydrochloric acid (20 ml, 0.233 mole) and the equivalent amount of sodium hydroxide (9.5 g, 0.233 mole). This produced a red pigment powder with CIElab colour coordinates: Lightness 48.47, Chroma 60.46 and Hue angle 41.40. Its band gap energy was estimated to be 2.05 eV and its midpoint wavelength 607 nm.

EXAMPLE 94

The procedure of Example 92 was repeated except using 98% sulphuric acid (10 ml, 0.184 mole) and sodium hydroxide (15.0 g, 0.368 mole). With this quantity of sodium hydroxide, the selenium and sulphur are soluble at room temperature and the warming stage was omitted. A red pigment powder was produced, with CIElab colour coordinates: Lightness 46.69, Chroma 43.10 and Hue angle 44.87. Its band gap energy was estimated to be 2.06 eV and its midpoint wavelength 604 nm.

EXAMPLES 95-97

The method of Example 93 was repeated, except using a 1% excess of selenium (1.596 g, 0.0202 mole). The copper to indium ratio was 1:1 and different doping levels were used. The following amounts of metal salts were used.

| Example | Zinc Oxide | Amounts Standard Copper Solution | Standard Indium Solution |
|---|---|---|---|
| 95 | 1.579 g (0.0193 mole) | 3.57 ml (0.00035 mole) | 7.88 ml (0.00035 mole) |
| 96 | 1.562 g (0.0191 mole) | 4.6 ml (0.00045 mole) | 10.13 ml (0.00045 mole) |
| 97 | 1.554 g (0.0190 mole) | 5.1 ml (0.0005 mole) | 11.25 ml (0.0005 mole) |

After firing, the materials were washed with aqueous sodium sulphide solution to produce a range of red to maroon pigment powders. The CIElab colour coordinates of the pigments are shown in the following Table, along with the band gap energies of the pigments.

| Example | Atomic % Dopant | Lightness | Chroma | Hue Angle, ° | Band Gap, eV | Wave Length, nm |
|---|---|---|---|---|---|---|
| 95 | 3.5 | 43.76 | 51.19 | 33.26 | 2.01 | 618 |
| 96 | 4.5 | 42.33 | 47.10 | 29.64 | 2.00 | 622 |
| 97 | 5 | 39.35 | 41.06 | 26.36 | 1.97 | 632 |

EXAMPLE 98

The following materials were placed in a five liter beaker:

| Ingredient | Amount |
|---|---|
| Water | 800 ml |
| Sodium hydroxide (98%) | 168 g (4.0 moles) |
| Selenium powder | 31.916 g (0.404 mole) |

-continued

| Ingredient | Amount |
|---|---|
| Sulphur powder | 6.592 g (0.206 mole) |

The following ingredients were placed in a two liter beaker:

| Ingredient | Amount |
|---|---|
| Water | 800 ml |
| Hydrochloric acid (35%) | 343 ml (4.0 moles) |
| Zinc Oxide | 32.396 g (0.396 mole) |
| Standard copper solution | 20.43 ml (0.002 mole) |
| Standard indium solution | 45.02 ml (0.002 mole) |

The sodium hydroxide solution was warmed slightly whilst being stirred in order to dissolve the selenium and sulphur. The zinc solution was then added to it over a period of 40 minutes, using a peristaltic pump. The pH was then adjusted to 6.5 and the stirring was continued for a further 40 minutes. The washing, drying, firing and final wash of the resultant precipitate were carried out as described in Examples 86-89. The pigment produced was an orange colour and was zinc selenide containing in solid solution 1 atomic percent dopant. The CIElab colour coordinates of the pigment powder were measured as follows: Lightness 59.90, Chroma 70.82 and Hue angle 54.49. Its band gap energy was estimated to be 2.05 eV and its midpoint wavelength 576 nm.

EXAMPLE 99

In this Example, sodium sulphide was used in place of sulphur. The following ingredients were placed in a 100 ml beaker:

| Ingredient | Amount |
|---|---|
| Water | 25 ml |
| Sodium sulphide (35%) | 1.486 g (0.0067 mole) |
| Sodium hydroxide (98%) | 1.375 g (0.0337 mole) |
| Selenium powder | 1.58 g (0.02 mole) |

The following materials were placed in a separate 100 ml beaker:

| Ingredient | Amount |
|---|---|
| Water | 50 ml |
| Zinc sulphate heptahydrate | 5.521 g (0.0192 mole) |
| Standard copper solution | 3.96 ml (0.000388 mole) |
| Standard indium solution | 9.09 ml (0.000404 mole) |

The process described in Example 72 was repeated, except that the material was fired at 850° C. The resultant pigment powder was a red colour, and was zinc selenide containing in solid solution 4 atomic percent dopant. The CIElab colour coordinates of the pigment powder were measured as follows: Lightness 38.80, Chroma 39.63 and Hue angle 28.78. Its band gap energy was estimated to be 1.97 eV and its midpoint wavelength 633 nm.

EXAMPLE 100

This Example describes the preparation of a sulphoselenide material, where the ratio of sulphide to selenide is approximately 1:1. The following materials were placed in a 100 ml beaker:

| Ingredient | Amount | |
|---|---|---|
| Water | 25 ml | |
| Sodium sulphide (35%) | 4.457 g | (0.02 mole) |
| Selenium powder | 1.185 g | (0.015) |

The following materials were placed in a second 100 ml beaker:

| Ingredient | Amount | |
|---|---|---|
| Water | 40 ml | |
| Zinc sulphate heptahydrate | 8.454 g | (0.0294 mole) |
| Standard copper solution | 3.065 ml | (0.0003 mole) |
| Standard indium solution | 6.75 ml | (0.0003 mole) |

In a 250 ml beaker, sodium hydroxide (0.829 g, 0.0203 mole) was dissolved in water (25 ml). The sodium sulphide and zinc solutions were both split into three equal aliquats. These aliquots were then added alternately, zinc aliquot first, to the stirred sodium hydroxide solution. The mixture was stirred for 1 hour and the resultant red-brown precipitate was then suction filtered, washed with water and dried under vacuum at 100° C. The dry material was ground to a powder using an agate mortar and pestle and fired at 850° C. for 1 hour, as described in Example 72. The deep yellow pigment powder which resulted contained 2 atomic percent dopant. Its CIElab colour coordinates were measured as follows: Lightness 72.11, Chroma 74.38 and Hue angle 72.66. Its band gap energy was estimated to be 2.31 eV and its midpoint wavelength 537 nm.

EXAMPLE 101

The process of Example 100 was repeated, differing only in the relative amounts of metals used. The quantities of metal salts involved were:

| Ingredient | Amount | |
|---|---|---|
| Zinc sulphate heptahydrate | 8.281 g | (0.0288 mole) |
| Standard copper solution | 6.13 ml | (0.0006 mole) |
| Standard indium solution | 13.51 ml | (0.0006 mole) |

This produced an orange pigment powder, which contained 4 atomic percent dopant. The CIElab colour coordinates of the pigment were measured as follows: Lightness 62.01, Chroma 67.25 and Hue angle 61.05. Its band gap energy was estimated to be 2.20 eV and its midpoint wavelength 562 nm.

EXAMPLE 102

This Example describes the preparation of a sulphoselenide material in which the sulphide to selenide ratio is approximately 1:2. The following materials were placed in a 100 ml beaker:

| Ingredient | Amount | |
|---|---|---|
| Water | 25 ml | |
| Sodium sulphide (35%) | 2.229 g | (0.01 mole) |
| Sodium hydroxide (98%) | 1.657 g | (0.0406 mole) |
| Selenium powder | 1.58 g | (0.02 mole) |
| Sulphur powder | 0.32 g | (0.01 mole) |

The following materials were placed in a second 100 ml beaker:

| Ingredient | Amount | |
|---|---|---|
| Water | 30 ml | |
| Zinc sulphate heptahydrate | 8.281 g | (0.0288 mole) |
| Standard copper solution | 6.13 ml | (0.0006 mole) |
| Standard indium solution | 13.51 ml | (0.0006 mole) |

The zinc solution was added to the stirred sodium sulphide solution over a period of two minutes. The mixture was stirred for 1 hour and the resultant precipitate was suction filtered and dried under vacuum at 100° C. The material was then fired as described in Example 90. The resultant pigment powder was golden yellow, and contained 2 atomic percent dopant. The CIElab colour coordinates of the pigment were measured as follows: Lightness 68.56, Chroma 71.65 and Hue angle 65.36. Its band gap energy was estimated to be 2.02 eV and its midpoint wavelength 558 nm.

EXAMPLES 103–104

The procedure of Example 102 was repeated except that the dopant level was changed by varying the quantities of zinc, copper and indium used. The amount of metal salts were:

| | Amounts | | |
|---|---|---|---|
| Example | Zinc Sulphate Heptahydrate | Standard Copper Solution | Standard Indium Solution |
| 103 | 7.936 g (0.0276 mole) | 11.95 ml (0.00117 mole) | 27.24 ml (0.00121 mole) |
| 104 | 7.591 g (0.0264 mole) | 17.84 ml (0.001746 mole) | 40.92 ml (0.001818 mole) |

The pigment produced by Example 103 was an orange colour, whilst that of Example 104 was deep red. The CIElab colour coordinates of the pigment powders are shown in the following Table, along with the band gap energies of the pigments.

| Example | Atomic % Dopant | Lightness | Chroma | Hue Angle, ° | Band Gap, eV | Wave Length, nm |
|---|---|---|---|---|---|---|
| 103 | 8 | 49.67 | 57.79 | 49.97 | 2.15 | 577 |
| 104 | 12 | 34.36 | 33.41 | 32.68 | 1.92 | 648 |

EXAMPLE 105

The materials of Examples 102–104 can also be prepared without using sulphur. The following ingredients were placed in an 800 ml beaker:

| Ingredient | Amount | |
|---|---|---|
| Water | 100 ml | |
| Sodium sulphide (35%) | 13.371 g | (0.06 mole) |
| Sodium hydroxide (98%) | 3.918 g | (0.096 mole) |

| Ingredient | Amount | |
|---|---|---|
| Selenium powder | 5.688 g | (0.072 mole) |

The following ingredients were placed in a 400 ml beaker:

| Ingredient | Amount | |
|---|---|---|
| Water | 250 ml | |
| Zinc sulphate heptahydrate | 28.755 g | (0.10 mole) |
| Copper nitrate trihydrate | 0.959 g | (0.00397 mole) |
| Indium nitrate pentahydrate | 1.568 g | (0.00401 mole) |

The sodium sulphide solution was heated to 80° C. and the zinc solution was added to it, with stirring, over a period of 3 minutes. The temperature was reduced to 40° C. and stirring was continued for 1 hour. The resultant precipitate was then treated as described in Example 102. The pigment powder produced was an orange colour, and contained 7.4 atomic percent dopant. Its CIElab colour coordinates were measured as follows: Lightness 44.22, Chroma 48.32 and Hue angle 41.25. Its band gap energy was estimated to be 2.06 eV and its midpoint wavelength 600 nm.

EXAMPLE 106

This Example describes the preparation of a sulphoselenide material in which the ratio of sulphide to selenide is approximately 1:4. The following materials were placed in a 100 ml beaker.

| Ingredient | Amount |
|---|---|
| Water | 30 ml |
| Sodium sulphide (35%) | 1.337 g (0.006 mole) |
| Sodium hydroxide (98%) | 2.008 g (0.0492 mole) |
| Selenium powder | 1.896 g (0.024 mole) |
| Sulphur powder | 0.416 g (0.013 mole) |

The following materials were placed in a second 100 ml beaker:

| Ingredient | Amount |
|---|---|
| Water | 20 ml |
| Zinc sulphate heptahydrate | 7.936 g (0.0276 mole) |
| Standard copper solution | 11.95 ml (0.00117 mole) |
| Standard indium solution | 27.24 ml (0.00121 mole) |

The sodium sulphide solution was warmed to 80° C. to dissolve the sulphur and selenium and the method of Example 102 was repeated except maintaining the temperature of the mixture at 40° C. After firing, a red powder was obtained which contained 8 atomic percent dopant. The CIElab colour coordinates of the pigment were: Lightness 37.15, Chroma 43.41 and Hue angle 35.65. Its band gap energy was estimated to be 1.95 eV and its midpoint wavelength 639 nm.

EXAMPLES 107–125

The dopant, CuInSSe, was prepared by the procedure of Example 15. 0.226 g of this powder was intimately mixed with 22.480 g of ZnSe in an agate mortar and pestle. The mixture was divided between a number of quartz ampoules so that each contained about 1.0 g of powder. The ampoules were fired in a furnace using a variety of peak temperatures, residence times and heating and cooling rates. These conditions are listed in the following Table. After cooling, the ampoules were opened and the contents lightly broken up to give bright orange pigment powders. The pigments were zinc selenide containing 0.5 mole percent CuInSSe. The CIElab colour coordinates of the pigment powders are shown in the following Table, along with the band gap energies of the pigments.

In each case the pigment is 0.5 mole % CuInSSe with 99.5 mole % ZnSe.

| Example | Peak Temp, °C. | Residence time at peak temp, hrs | Heating rate, °C./min | Cooling rate, °C./min | Lightness | Chroma | Hue angle, ° | Band gap, eV | Wavelength, nm |
|---|---|---|---|---|---|---|---|---|---|
| 107 | 1000 | 10 | 5 | 5 | 55.87 | 52.63 | 45.81 | 2.14 | 579 |
| 108 | 950 | 10 | 5 | 2 | 56.73 | 58.03 | 47.18 | 2.14 | 579 |
| 109 | 900 | 10 | 10 | 10 | 60.35 | 62.87 | 48.57 | 2.13 | 582 |
| 110 | 900 | 10 | 5 | 5 | 59.61 | 60.73 | 48.76 | 2.13 | 582 |
| 111 | 900 | 10 | 2 | 2 | 59.96 | 61.08 | 48.40 | 2.13 | 582 |
| 112 | 875 | 10 | 10 | 10 | 60.13 | 61.74 | 49.23 | 2.12 | 584 |
| 113 | 850 | 10 | 10 | 10 | 61.19 | 64.95 | 51.89 | 2.16 | 574 |
| 114 | 825 | 10 | 10 | 10 | 60.37 | 63.66 | 51.49 | 2.10 | 589 |
| 115 | 800 | 10 | 10 | 10 | 64.15 | 60.54 | 55.17 | 2.13 | 582 |
| 116 | 850 | 7 | 10 | 10 | 61.46 | 62.06 | 52.68 | 2.16 | 574 |
| 117 | 850 | 6 | 10 | 10 | 59.23 | 64.83 | 52.51 | 2.12 | 584 |
| 118 | 850 | 5 | 10 | 10 | 62.40 | 65.66 | 53.74 | 2.12 | 584 |
| 119 | 850 | 4 | 10 | 10 | 63.10 | 63.07 | 55.06 | 2.10 | 589 |
| 120 | 850 | 3 | 10 | 10 | 62.65 | 62.27 | 55.53 | 2.13 | 582 |
| 121 | 850 | 1 | 10 | 10 | 67.01 | 57.12 | 64.56 | 2.11 | 587 |
| 122 | 900 | 5 | 10 | 10 | 59.71 | 63.36 | 50.59 | 2.13 | 582 |
| 123 | 855 | 5 | 10 | 10 | 62.49 | 63.75 | 52.67 | 2.13 | 582 |
| 124 | 845 | 5 | 10 | 10 | 61.51 | 63.47 | 53.65 | 2.16 | 574 |
| 125 | 840 | 5 | 10 | 10 | 62.19 | 63.07 | 53.82 | 2.10 | 589 |

EXAMPLE 126

0.086 g of the dopant of Example 32 and 2.000 g of ZnSe were intimately mixed using an agate mortar and pestle, and then placed in a quartz ampoule which was then evacuated. The mixture was calcined in a furnace at about 850° C. for 10 hours, using a heating and cooling rate of 10° C. per minute. After cooling, the ampoule was opened and the contents lightly broken up to produce a red pigment powder. Its CIElab colour coordinates were: Lightness 42.88, Chroma 46.46 and Hue angle 33.79. Its band gap energy was estimated to be 2.00 eV and its midpoint wavelength 623 nm.

The powder was then placed in another quartz ampoule which was then evacuated. The powder was then re-calcined in a furnace at about 850° C. for 5 hours, using a heating and cooling rate of 10° C. per minute. After cooling, the ampoule was opened and the contents lightly broken up to produce a darker red pigment powder. The new CIElab colour coordinates were: Lightness 39.81, Chroma 40.90 and Hue angle 25.75. Its band gap energy was estimated to be 1.98 eV and its midpoint wavelength 627 nm.

EXAMPLE 127

An alumina boat, approximately 10 cm×1.5 cm×1 cm was filled with the unfired solution route precursor of Example 72, and placed in a small tube furnace. This was flushed prior to firing with a mixture of 5% hydrogen, 1% helium, 94% nitrogen (by volume). The gas flow rate was then reduced to 10 ml per minute and the hot zone of the furnace was raised to about 400° C. The alumina boat was then inserted into the hot zone, and the temperature held steady for 30 minutes. The temperature was then raised to about 650° C. at a heating rate of 5° C. per minute, and held at this temperature for an hour. After firing, the material was allowed to cool under argon, and then removed from the furnace. The resultant powder was a deep golden yellow colour. Its CIElab colour coordinates were: Lightness 73.79, Chroma 68.75 and Hue angle 78.50. Its band gap energy was estimated to be 2.34 eV and its midpoint wavelength 529 nm.

EXAMPLE 128

Following the procedure of Example 127 the same unfired solution route precursor was fired at 650° C. for 1 hour, with a gas flow rate of 2 ml per minute. After firing, the resultant pigment powder was a deep golden yellow colour. Its CIElab colour coordinates were: Lightness 72.10, Chroma 70.27 and Hue angle 75.46. Its band gap energy was estimated to be 2.31 eV and its midpoint wavelength 536 nm.

EXAMPLE 129

Following the procedure of Example 127 the same unfired solution route precursor was fired at 850° C. for 1 hour, with a gas flow rate of 2 ml per minute. After firing, the resultant pigment powder was bright orange. Its CIElab colour coordinates were: Lightness 66.90, Chroma 68.98 and Hue angle 59.84. Its band gap energy was estimated to be 2.19 eV and its midpoint wavelength 564 nm.

EXAMPLE 130

A few milligrams of the pigment powder prepared in Example 127 were suspended in MiBK (methyl isobutyl ketone). One drop of the suspension was placed on a small clean aluminium stub which had previously been polished to a one micron finish with diamond. After drying, the specimen was coated with gold, and examined in a Scanning Electron Microscope, using secondary electrons, at magnifications varying between ×400 and ×40000.

The pigment powder was found to have a primary particle size of 100–500 nm.

EXAMPLE 131

Using the procedure of Example 130, the pigment powder of Example 129 was examined in the Scanning Electron Microscope. Its primary particle size was found to be 100–3000 nm.

EXAMPLE 132

The pigment of Example 31 was dispersed into resin by tumble mixing, and injection moulded at 220° C. to form a sheet of coloured crystal polystyrene containing the pigment at a loading of 1% by weight. Its CIElab colour coordinates were then measured as follows: Lightness 46.86, Chroma 46.35 and Hue angle 50.46. Its band gap energy was estimated to be 2.15 eV and its midpoint wavelength 576 nm.

EXAMPLE 133

The pigment of Example 4 was dispersed into resin by tumble mixing, and injection moulded at 190° C. to form a sheet of coloured polypropylene containing the pigment at a loading of 1% by weight. Its CIElab colour coordinates were then measured as follows: Lightness 55.40, Chroma 40.61 and Hue angle 63.77. Its band gap energy was estimated to be 2.24 eV and its midpoint wavelength 553 nm.

EXAMPLE 134

The pigment of Example 6 was dispersed into resin by tumble mixing, and injection moulded at 155° C. to form a sheet of coloured high density polyethylene (HDPE) containing the pigment at a loading of 1% by weight. Its CIElab colour coordinates were then measured as follows: Lightness 50.20, Chroma 32.67 and Hue angle 49.23. Its band gap energy was estimated to be 2.14 eV and its midpoint wavelength 579 nm.

EXAMPLE 135

The pigment of Example 6 was dispersed into resin by tumble mixing, and injection moulded at 150° C. to form a sheet of coloured low density polyethylene (LDPE) containing the pigment at a loading of 1% by weight. Its CIElab colour cooordinates were then measured as follows: Lightness 44.89, Chroma 30.18 and Hue angle 48.58. Its band gap energy was estimated to be 2.15 eV and its midpoint wavelength 576 nm.

EXAMPLE 136

The polymer, acrylonitrile-butadiene-styrene (ABS), was pre-dried at 70° C. for 4 hours. The pigment of Example 32 was then dispersed into the resin by tumble mixing, and injection moulded at 240° C. to form a sheet of coloured ABS containing the pigment at a loading of 1% by weight. Its CIElab colour coordinates were then measured as follows: Lightness 55.24, Chroma 29.75 and Hue angle 39.88. Its band gap energy was estimated to be 2.08 eV and its midpoint wavelength 596 nm.

EXAMPLE 137

The polymer, polymethyl methacrylate (PMMA), was pre-dried at 70° C. for 4 hours. The pigment of Example 6 was then dispersed into the resin by tumble mixing, and injection moulded at 220° C. to form a sheet of coloured PMMA containing the pigment at a loading of 1% by weight. Its CIElab colour coordinates were then measured as follows: Lightness 54.42, Chroma 48.68 and Hue angle 56.33. Its band gap energy was estimated to be 2.12 eV and its midpoint wavelength 584 nm.

EXAMPLE 138

The polymer, Nylon(6,6), was pre-dried overnight at 60° C. The pigment of Example 98 was then dispersed into the resin by tumble mixing, and injection moulded at 310° C. to form a sheet of coloured Nylon containing the pigment at a loading of 1% by weight. Its CIElab colour coordinates were then measured as follows: Lightness 56.70, Chroma 50.77 and Hue angle 59.58. Its band gap energy was estimated to be 2.22 eV and its midpoint wavelength 577 nm.

EXAMPLE 139

The polymer, polycarbonate, was pre-dried overnight at 60° C. The pigment of Example 127 was then dispersed into the resin by tumble mixing, and injection moulded at 280° C. to form a sheet of coloured polycarbonate containing the pigment at a loading of 0.5% by weight. Its CIElab colour coordinates were then measured as follows: Lightness 65.55, Chroma 53.48 and Hue angle 77.79. Its band gap energy was estimated to be 2.34 eV and its midpoint wavelength 529 nm.

EXAMPLES 140–143

Using a palette knife, 0.20 g of each of the pigments of Examples 86, 87, 96 and 97, was mixed, in turn, on a glass slab, with a few drops of di-iso-octyl phthalate. 5 g of plasticized polyvinyl chloride (PVC) paste was added to each and intimately mixed with the pigments. One of the mixtures was then transferred to form a small pool on a 10 inch × 10 inch (2.5 cm × 2.5 cm) glass plate. Using a machined stainless steel bar, the mixture was drawn down to form an even layer of thickness 0.75 mm. The material was then cured in an air oven at 140° C. for 20 minutes, to form a sheet of coloured PVC containing the pigment at a loading of 4% by weight. After curing, the PVC sheet was peeled from the glass plate. The other three pigment mixtures were then, in turn, drawn down and cured to form coloured PVC sheets in the same way. The CIElab colour coordinates of the PVC sheets are shown in the following Table, along with the band gap energies of the samples.

| Example | Atomic % Dopant | Lightness | Chroma | Hue Angle, ° | Band Gap, eV | Wave Length, nm |
|---|---|---|---|---|---|---|
| 140 | 1 | 62.64 | 68.60 | 57.12 | 2.17 | 569 |
| 141 | 2 | 55.84 | 63.38 | 48.20 | 2.11 | 587 |
| 142 | 4.5 | 40.21 | 42.48 | 28.36 | 2.00 | 621 |
| 143 | 5 | 38.45 | 39.05 | 26.76 | 1.98 | 629 |

EXAMPLES 144–151

Using a porcelain mortar and pestle, single crystal ZnSe was hand ground to produce a bright yellow powder. Approximately 20 g of this material was doped at 1 mole percent with the CuInSSe dopant prepared in Example 15. The ZnSe and the dopant were intimately mixed using an agate mortar and pestle, and then placed in a quartz ampoule which was then evacuated. The mixture was calcined in a furnace at about 850° C. for 5 hours, using a heating and cooling rate of 10° C. per minute. After cooling, the ampoule was opened and the contents lightly broken up to produce an orange pigment powder.

Following the procedure of Example 133 this pigment was injection moulded into polypropylene at a range of loadings from 0.01% to 20% by weight. This produced a range of plaques varying in colour from off-white in the case of the 0.01% loading, through to deep orange in the case of the 20% loading. The CIElab colour coordinates of the plaques are shown in the following Table, along with their band gap energies.

| Example | Pigment Loading % (w/w) | Lightness | Chroma | Hue Angle, ° | Band Gap, eV | Wave Length, nm |
|---|---|---|---|---|---|---|
| 144 | 0.01 | 53.51 | 3.13 | 258.94 | — | — |
| 145 | 0.1 | 51.26 | 6.62 | 59.23 | — | — |
| 146 | 0.5 | 51.49 | 22.83 | 55.34 | 2.20 | 562 |
| 147 | 1.0 | 51.08 | 29.48 | 52.43 | 2.18 | 569 |
| 148 | 2.0 | 50.59 | 35.34 | 51.59 | 2.15 | 576 |
| 149 | 5.0 | 49.56 | 41.06 | 47.06 | 2.10 | 588 |
| 150 | 10.0 | 47.47 | 40.24 | 45.04 | 2.09 | 592 |
| 151 | 20.0 | 47.62 | 40.79 | 44.15 | 2.07 | 599 |

EXAMPLES 152–159

Using the procedure of Example 140 the pigment of Example 127 was drawn down in PVC at a range of loadings from 0.01 to 20% by weight. This produced a range of coloured sheets varying from off-white in the case of the 0.01% loading, through to deep golden yellow in the case of the 20% loading. The CIElab colour coordinates of the plaques are shown in the following Table, along with their band gap energies.

| Example | Pigment Loading % (w/w) | Lightness | Chroma | Hue Angle, ° | Band Gap, eV | Wave Length, nm |
|---|---|---|---|---|---|---|
| 152 | 0.01 | 81.26 | 16.85 | 88.86 | — | — |
| 153 | 0.1 | 78.54 | 42.76 | 87.92 | 2.49 | 497 |
| 154 | 0.5 | 71.95 | 63.45 | 77.06 | 2.38 | 529 |
| 155 | 1.0 | 69.97 | 64.09 | 74.27 | 2.30 | 538 |
| 156 | 2.0 | 68.43 | 62.84 | 73.38 | 2.31 | 536 |
| 157 | 5.0 | 67.57 | 62.28 | 73.64 | 2.31 | 536 |
| 158 | 10.0 | 65.83 | 60.41 | 72.55 | 2.30 | 538 |
| 159 | 20.0 | 66.01 | 60.53 | 72.68 | 2.32 | 534 |

EXAMPLE 160

0.116 g of the pigment of Example 4 was intimately mixed with 0.834 g of TiO$_2$, using an agate mortar and pestle. The mixture was dispersed into resin, and injection moulded at 220° C. to form a sheet of coloured crystal polystyrene containing the reduced-shade pigment at a loading of 1% by weight. Its CIElab colour coordinates were then measured as follows: Lightness 85.94, Chroma 12.46 and Hue angle 68.59.

EXAMPLE 161

0.116 g of the pigment of Example 31 was intimately mixed with 0.834 g of TiO$_2$, using an agate mortar and pestle. The mixture was dispersed into resin, and injection moulded at 220° C. to form a sheet of coloured crystal polystyrene containing the reduced-shade pigment at a loading of 1% by weight. Its CIElab colour coordinates were then measured as follows: Lightness 83.42, Chroma 15.62 and Hue angle 63.93.

EXAMPLE 162

Using the procedure of Example 133, the pigment of Example 118 was injection moulded into polypropylene. A plaque containing this material was then subjected to the Xenotest 150 Accelerated Lightfastness Apparatus. The specimen was cut to the required size (3 inches × 1.5 inches) (7.6 cm × 3.8 cm). It was placed in a holder and covered with a masking panel, which has a 4 inch (10.2 cm) long window over half its width. Thus, the specimen was exposed over half its area only. One half of the plaque therefore acted as a control, while the other half was exposed to the light source. In this test, the light source used was a Xenon arc lamp.

The plaque was exposed alternately to light and water, the duration for each being 29 minutes light and 1 minute water. The water was sprayed by high-powered water jets and the temperature was held at 30° C., 1 inch (2.5 cm) from the specimen. Visual and instrumental assessments were carried out every 200 hours. After a total of 1670 hours had been completed, the plaque appeared slightly darker. The change in colour coordinates compared with the control were measured as follows: Change in Lightness −1.14, change in Chroma −0.95 and change in Hue angle −0.78.

EXAMPLE 163

The procedure of Example 74 was repeated, but in this case the quantities were increased by a factor of 10 and the zinc solution was added at a rate of 390 $cm^3$ per minute using a peristaltic pump. The resulting precipitate was aged for 90 minutes at a temperature of 60°-65° C. The precipitate was washed in water and dried overnight in an air oven at 85° C. The material was then sealed in a quartz ampoule under vacuum and fired at 650° C. for 1 hour using a heating and cooling rate of 10° C. per minute. The CIElab colour coordinates of the resulting red pigment powder were: Lightness 41.67, Chroma 49.75 and Hue angle 34.34. Its band gap energy was estimated to be 1.99 eV and its midpoint wavelength was 624 nm.

EXAMPLE 164

Example 163 was repeated, except that the dried precipitate was packed by vibration into an 8 $cm^3$ porcelain crucible until it was completely filled. A porcelain lid was then sealed on with china clay paste. The material was fired in a furnace at 850° C. for 4 hours using a heating rate of 13° C. per minute. After firing, the material was allowed to cool to 750° C. whereupon it was withdrawn from the furnace and allowed to cool to room temperature. The red pigment powder was removed from the crucible. Following the procedure of Examples 140–143, the material was dispersed in a PVC sheet and the CIElab colour coordinates were measured as follows: Lightness 48.27, Chroma 32.95 and Hue angle 29.64.

EXAMPLE 165

The procedure of Example 83 was repeated at 10 fold scale except that in this case, a 40% excess of zinc was used, technical grade materials were used, and the volume of water used for the alkali solution was 20 ml, equating to 20M NaOH. The sodium hydroxide, copper nitrate and indium nitrate solutions were of AnalaR specification. Except for the aforementioned solutions, tap water was used for making solutions and for washing the precipitate. The precipitation temperature was measured at 15° C. and the precipitate was aged at 15° C. for 90 minutes before drying. The CIElab colour coordinates were measured for the fired red pigment powder: Lightness 42.76, Chroma 46.52 and Hue angle 40.94. Its band gap energy was estimated to be 2.00 eV and its midpoint wavelength was 620 nm. When dispersed in a PVC sheet as described in Examples 140–143, the material gave the following CIElab colour coordinates: Lightness 43.87, Chroma 37.49 and Hue angle 45.17.

EXAMPLE 166

The procedure of Example 165 was repeated using the firing procedure described in Example 164 with a 1 hour rather than a 4 hour residence time. The red pigment powder was washed with sodium sulphide solution (10 g of 62–64% $Na_2S$ in 500 ml water).

The powder had the following CIElab colour coordinates: Lightness 48.69, Chroma 47.49 and Hue angle 39.47. When dispersed in a PVC sheet according to Examples 140–143, the material had the following CIElab colour coordinates: Lightness 48.61, Chroma 50.06 and Hue angle 40.50.

EXAMPLE 167

The procedure of Example 166 was repeated except that the material was ground by hand after firing using an agate mortar and pestle. When dispersed in a PVC sheet using the procedure described in Examples 140–143, the following CIElab colour coordinates were obtained: Lightness 48.61, Chroma 50.06 and Hue angle 40.50.

EXAMPLE 168

The procedure of Example 166 was repeated except that the material was bead milled after firing. The method was as follows: 10 g of pigment powder, 50 g of low lead 1 mm diameter glass ballotini, 25 $cm^3$ of tap water and 1 g of sodium sulphide (62–64% $Na_2S$, technical grade) were placed in a 100 $cm^3$ polyethylene pot and milled with a triple-bladed polyurethane rotor at 2000 revolutions per minute for 5 minutes. After grinding, the pigment was separated from the ballotini using a fine mesh sieve, washed with tap water and dried. When dispersed in a PVC sheet according to Examples 140–143, the following CIElab colour coordinates were measured: Lightness 48.87, Chroma 50.86 and Hue angle 41.50.

EXAMPLE 169

The procedure of Example 166 was repeated except that the precipitation temperature was measured at 20° C., the time taken to mix the two solutions was 30 seconds, the precipitate was aged for 90 minutes at 20° C. and the firing conditions were as described in Example 163. The CIElab colour coordinates of the resulting red pigment powder were measured as follows: Lightness 41.86, Chroma 42.59 and Hue angle 45.72. Its band gap energy was estimated to be 2.04 eV and its midpoint wavelength 614 nm. When dispersed in PVC according to Examples 140–143, the following CIElab colour coordinates were obtained: Lightness 41.49, Chroma 30.18 and Hue angle 49.12.

EXAMPLE 170

The procedure of Example 169 was used except that the material was fired by packing with vibration into an 8 $cm^3$ porcelain crucible until it was completely filled. A flat tile was used as a lid, sealed with china clay paste, in order to prevent the ingress of air. The material was fired for 1 hour at 850° C. using a heating rate of 10° C. per minute. After firing, the material was allowed to cool to about 700° C. whereupon it was withdrawn from the furnace and allowed to cool to room temperature. The red pigment powder was removed from the crucible and washed with sodium sulphide solution (10 g of 62–64% $Na_2S$ in 500 ml water). The CIElab colour coordinates of the powder were measured as follows: Lightness 47.69, Chroma 39.38 and Hue angle 47.78.

EXAMPLE 171

The procedure of Example 165 was repeated except that, in this case, no excess of zinc was used and the volume of tap water used to make the combined zinc, copper and indium solutions was reduced from 3.5 liters to 480 $cm^3$. The alkali solution was added to the latter over a period of 40 seconds. The precipitation temperature was 15° C. and the precipitate was aged at 30° C. for 1 hour. A further 200 $cm^3$ of tap water was added to reduce the viscosity, followed by sufficient 3.6 mM sulphuric acid solution to reduce the pH to 7.0. The fired red pigment powder had the following CIElab colour coordinates: Lightness 33.87, Chroma 20.52 and Hue angle 34.28. Its band gap energy was estimated to be 2.09 eV and its midpoint wavelength was 592 nm.

EXAMPLE 172

The procedure of Example 171 was repeated, except that the volume of tap water used to make the combined zinc, copper and indium solutions was increased from 480 $cm^3$ to 2 liters, and the final precipitate was not washed. The material was fired, bead-milled and evaluated as in Example 168. The CIElab colour coordinates were as follows when dispersed in a PVC sheet according to Examples 140–143: Lightness 47.62, Chroma 43.32 and Hue angle 47.38

EXAMPLE 173

The procedure of Example 172 was repeated, except that the crucible was removed from the furnace and the powder was quenched by immersing it directly into cold tap water. After dispersing in a PVC sheet according to the method of Examples 140–143, the material had the following CIElab colour coordinates: Lightness 48.50, Chroma 40.58 and Hue angle 49.81.

EXAMPLE 174

The method of Example 91 was repeated at 10-fold scale, except that the alkaline solution was added to the metals solution, using 27.77 g of AnalaR $ZnCl_2$ (96% by weight). One tenth of the volume of water was used for the alkali solution, equating to 20M NaOH. Apart from the standard metal solutions, tap water was used for making solutions. The precipitate was adjusted to pH 7 with concentrated hydrochloric acid, but was not washed further. The material was fired according to Example 163 and gave the following CIElab colour coordinates when dispersed in a PVC sheet according to Examples 140–143: Lightness 48.13, Chroma 18.69 and Hue angle 53.89.

EXAMPLE 175

The procedure of Example 174 was repeated, except that the material was fired according to Example 170. When dispersed in a PVC sheet according to Examples 140–143, the following CIElab colour coordinates were obtained: Lightness 49.66, Chroma 42.57 and Hue angle 50.75.

EXAMPLE 176

The procedure of Example 74 was repeated, except that in this case, the quantities were increased by a factor of 10. Except for the standard metal solutions, technical grade materials were used and tap water was used for making solutions and washing. The material was fired according to Example 163 and gave the following CIElab colour coordinates when dispersed in a PVC sheet according to Examples 140–143: Lightness 48.01, Chroma 28.43 and Hue angle 37.35.

EXAMPLE 177

The procedure of Example 176 was repeated, except that the material was fired according to Example 170. The material gave the following CIElab colour coordinates when dispersed in a PVC sheet according to Examples 140–143: Lightness 53.72, Chroma 39.98 and Hue angle 41.29.

EXAMPLE 178

The procedure of Example 171 was repeated, except that in this case, the volume of water used to make the combined metal solutions was 3.5 liters. After precipitation, the material was heated to 60° C. on a hotplate and was subsequently maintained at this temperature in a water bath for 45 minutes. During aging, the pH fell from 8.5 to 6.5. The fired red pigment powder had the following CIElab colour coordinates when dispersed in a PVC sheet according to Examples 140–143: Lightness 46.15, Chroma 14.71 and Hue angle 45.60.

EXAMPLE 179

The procedure of Example 178 was repeated, except that the material was fired according to Example 170. When dispersed in a PVC sheet as described in Examples 140–143, the material gave the following CIElab colour coordinates: Lightness 50.91, Chroma 31.03 and Hue angle 44.08.

I claim:

1. A pigment which comprises a cadmium lead and mercury free material comprising crystalline zinc selenide or selenosulphide wherein at least an effective amount below 40% of whose zinc atoms and optionally some of whose selenium and sulphur atoms are substituted to lower the band gap energy but retain the essential crystal lattice of the zinc selenide or selenosulphide, the resulting lattice containing a greater percentage of zinc atoms than of sulphur atoms.

2. A pigment which comprises a cadmium-, lead- and mercury-free material comprising crystalline zinc selenide or selenosulphide wherein at least an effective amount below 20% of whose zinc atoms and optionally some of whose selenium and sulphur atoms are substituted to lower the band gap energy but retain the essential crystal lattice of the zinc selenide or selenosulphide, the resulting lattice containing at least one third as many selenium atoms as sulphur atoms.

3. A pigment which comprises a cadmium-, lead and mercury free material comprising crystalline zinc selenide or selenosulphide wherein at least an effective amount below one third of whose zinc atoms and optionally some of whose selenium and sulphur atoms are substituted to lower the band gap energy but retain the essential crystal lattice of the zinc selenide or selenosulphide, the resulting lattice containing at least as many selenium atoms as sulphur atoms.

4. A pigment according to claim 1 wherein at least 0.1% of the zinc atoms are substituted.

5. A pigment according to claim 1 wherein less than 50% of the selenium and sulphur atoms are substituted.

6. A pigment according to claim 1 wherein:
(1) the zinc atoms which are substituted are substituted by atoms selected from (a) Cu, Ag and Li atoms and (b) In, Fe and Ga atoms in the proportion of 0.1-10 atoms of (b) per atom of (a); and,
(2) the selenium and sulphur atoms which are substituted are substituted by O atoms in the proportion of up to 100 atoms of O per atom of (a).

7. A pigment according to claim 6 wherein the proportion of (b) to (a) is 0.1-1.5 atoms of (b) per atom of (a), and selenium and sulphur atoms are not substituted.

8. A pigment according to claim 1 wherein the material contains an extender.

9. A pigment according to claim 1 wherein the hue angle of the material on the CIElab colour co-ordinates system is from 85° to 5°.

10. A pigment according to claim 1 wherein the number average maximum particle size of the material as measured by scanning electron microscopy is 0.01-5 micron.

11. A cadmium, lead- and mercury-free material comprising crystalline zinc selenide or selenosulphide at least 0.1% but below 40% of whose zinc atoms and optionally some of whose selenium and sulphur atoms are substituted to lower the band gap energy but retain the essential crystal lattice of the zinc selenide or selenosulphide, the resulting lattice containing a greater percentage of zinc atoms than of sulphur atoms.

12. A process for preparing a material claimed in claim 11 which process comprises forming a solid solution of the substituent moieties in zinc selenide or selenosulphide.

13. A substance coloured by containing dispersed therein a pigment claimed in claim 1.

14. A pigment according to claim 7, wherein (a) is Cu and (b) is In.

15. A pigment according to claim 1, wherein the dopant by which the crystalline zinc selenide or selenosulphide is substituted is gallium sulphide.

16. A pigment according to claim 6, wherein the hue angle of the material on the CIElab color co-ordinates system is from 85° to 5°.

17. A pigment according to claim 6, wherein the number average maximum particle size of the material as measured by scanning electron microscopy is 0.01-5 micron.

18. A material according to claim 14, wherein:
(1) the zinc atoms which are substituted are substituted by atoms selected from (a) Cu, Ag and Li atoms and (b) In, Fe and Ga atoms in the proportion of 0.1-10 atoms of (b) per atom of (a); and
(2) the selenium and sulphur atoms which are substituted are substituted by O atoms in the proportion of up to 100 atoms of O atoms of (a).

19. A substance according to claim 13, wherein:
(1) the zinc atoms which are substituted are substituted by atoms selected from (a) Cu, Ag and Li atoms and (B) In, Fe and Ga atoms in the proportion of 0.1-10 atoms of (b) per atom of (a); and
(2) the selenium and sulphur atoms which are substituted are substituted by O atoms in the proportion of up to 100 atoms of O per atom of (a).

20. A substance according to claim 13, which is a plastic article.

* * * * *

UNITED STATES PATENT AND TRADEMARK OFFICE
CERTIFICATE OF CORRECTION

PATENT NO.   :   5,152,229
DATED        :   October 6, 1992
INVENTOR(S)  :   John A. NIMMO It is certified that error appears in the above-identified patent and that said Letters Patent is hereby corrected as shown below:

Column 42, lines 42-43, (Claim 1, lines 1-2), "cadmium lead and mercury free" should read -- cadmium-, lead- and mercury-free --.

Column 42, lines 60-61, (Claim 3, lines 1-2), "lead and mercury free" should read -- lead- and mercury-free --.

Column 44, line 17, (Claim 18, line 1), "claim 14" should read -- claim 11 --;
line 24, (Claim 18, line 24), "O atoms" should read -- O per atom --.

Signed and Sealed this

Eleventh Day of January, 1994

Attest:

BRUCE LEHMAN

Attesting Officer    Commissioner of Patents and Trademarks